(12) United States Patent
Park et al.

(10) Patent No.: US 9,448,399 B2
(45) Date of Patent: *Sep. 20, 2016

(54) ELECTROWETTING DISPLAY DEVICE AND MANUFACTURING METHOD THEREOF

(71) Applicant: Amazon Technologies, Inc., Reno, NV (US)

(72) Inventors: Dae Jin Park, Incheon (KR); Seong Gyu Kwon, Suwon-si (KR); Ji Seong Yang, Seoul (KR); Jun Heui Lee, Suwon-Si (KR)

(73) Assignee: Amazon Technologies, Inc., Seattle, WA (US)

( * ) Notice: Subject to any disclaimer, the term of this patent is extended or adjusted under 35 U.S.C. 154(b) by 127 days.

This patent is subject to a terminal disclaimer.

(21) Appl. No.: 14/244,231

(22) Filed: Apr. 3, 2014

(65) Prior Publication Data

US 2014/0211294 A1 Jul. 31, 2014

Related U.S. Application Data

(63) Continuation of application No. 13/612,602, filed on Sep. 12, 2012, now Pat. No. 8,693,085.

(30) Foreign Application Priority Data

Mar. 14, 2012 (KR) .................. 10-2012-0026072

(51) Int. Cl.
*G02B 26/00* (2006.01)
*G09G 3/34* (2006.01)
(Continued)

(52) U.S. Cl.
CPC .............. *G02B 26/005* (2013.01); *B05D 1/26* (2013.01); *B08B 7/0035* (2013.01); *G02B 26/004* (2013.01); *G09G 3/348* (2013.01); *B05D 1/32* (2013.01); *G02B 2207/115* (2013.01); *G09G 2300/0404* (2013.01)

(58) Field of Classification Search
CPC .. G02B 26/00; G02B 26/004; G02B 26/005; G02B 2207/115; G09G 3/348; G09G 2300/04; G09G 2300/0404; G09G 2300/043; B05D 1/26; B05D 1/32; B05D 1/322
USPC ......... 359/290–295; 216/13, 17, 67; 427/58, 427/66, 558; 430/319, 321
See application file for complete search history.

(56) References Cited

U.S. PATENT DOCUMENTS 6,328,408 B1 12/2001 Gelbart
6,338,901 B1 1/2002 Veerasamy
(Continued)

FOREIGN PATENT DOCUMENTS

JP 2003344640 12/2003
JP 2004233929 8/2004
(Continued)

*Primary Examiner* — Loha Ben
(74) *Attorney, Agent, or Firm* — Lee & Hayes, PLLC

(57) ABSTRACT

A method of manufacturing an electrowetting display device includes forming a protection layer on a pixel electrode, forming a water-repellent layer on the protection layer, and removing the water-repellent layer from regions surrounding a display area of the pixel electrode. The water-repellent layer is formed by coating the protection layer with a hydrophilic material using a method such as slit coating. The water-repellent layer is removed using a method such as an edge bead removal method. The resulting water-repellent layer has a uniform thickness.

21 Claims, 29 Drawing Sheets

(51) Int. Cl.
 B05D 1/26 (2006.01)
 B08B 7/00 (2006.01)
 B05D 1/32 (2006.01)

(56) References Cited

U.S. PATENT DOCUMENTS

| | | |
|---|---|---|
| 7,636,187 B2 | 12/2009 | Morozumi et al. |
| 7,876,506 B2 | 1/2011 | Chen et al. |
| 7,993,819 B2 | 8/2011 | Lo et al. |
| 8,040,583 B2 | 10/2011 | Takahashi |
| 8,059,328 B1 | 11/2011 | Kuo et al. |
| 8,416,488 B2 * | 4/2013 | Hayes et al. ............ 359/290 |
| 8,514,479 B2 | 8/2013 | Bae et al. |
| 8,922,871 B2 * | 12/2014 | Choi et al. .............. 359/296 |
| 8,951,424 B2 * | 2/2015 | Shim et al. ................ 216/13 |
| 2009/0316253 A1 | 12/2009 | Fairley et al. |
| 2011/0157678 A1 | 6/2011 | Chen et al. |
| 2013/0242372 A1 | 9/2013 | Park et al. |
| 2013/0271816 A1 | 10/2013 | Shim et al. |

FOREIGN PATENT DOCUMENTS

| | | |
|---|---|---|
| JP | 2005062543 | 3/2005 |
| JP | 2007033090 | 2/2007 |
| KR | 1020030092314 A | 12/2003 |
| KR | 1020050043221 A | 5/2005 |
| KR | 1020070045014 A | 5/2007 |
| KR | 1020080001949 A | 1/2008 |
| KR | 1020110063052 A | 6/2011 |

* cited by examiner

FIG. 17

| Condition | No protection layer | Thin protection layer | Thick protection layer |
|---|---|---|---|
| 205V 30s on/10s off Four times | | | |
| 200V 20s on/10s off Two times | | | |

ELECTROWETTING DISPLAY DEVICE AND MANUFACTURING METHOD THEREOF

CROSS REFERENCE TO RELATED PATENT APPLICATION

This application is a continuation of and claims priority to U.S. patent application Ser. No. 13/612,602, now U.S. Pat. No. 8,693,085, issued Apr. 8, 2014, which claims the benefit of Korean Patent Application No. 10-2012-0026072, filed in the Korean Intellectual Property Office on Mar. 14, 2012, which are herein incorporated by reference.

BACKGROUND

Technical Field

The present disclosure is directed to an electrowetting display device and a manufacturing method thereof.

Examples of flat panel displays include a liquid crystal display (LCD), a plasma display device (PDP), an organic light emitting display (OLED), a field effect display (FED), an electrophoretic display (EPD), and an electrowetting display device (EWD).

Of these displays, an electrowetting display device displays a grayscale by controlling the movement of an electrolytic oil in water. The electrowetting display device is a shutter type display device with good transmittance due to a lack of a polarizer, and a gamma characteristic that is linear with respect to voltage. In addition, an electrowetting display device may be either a reflective type that does not use a backlight, or a transmissive type, and may be manufactured with a shape suitable for the environment in which the display device is to be used.

The thin film transistor (TFT) of an electrowetting display device may be formed similar to those of other flat panel displays, such as liquid crystal displays, but requires an additional step of filling the water and the oil. To normally operate an electrowetting display device, a hydrophobic, water repellent layer is positioned under the oil, however the water-repellent layer should have an openable pad portion for connecting the wiring of the display panel to an external driving integrated circuit (IC). Accordingly, it is necessary to open the water-repellent layer, however the additional process of opening the water-repellent layer increases the manufacturing cost and processing time.

SUMMARY

Embodiments of the present disclosure provide an electrowetting display device and a manufacturing method thereof for uniformly coating a water-repellent layer and easily forming an opening in a pad portion.

A method of manufacturing an electrowetting display device including a display area, a pad region, and a middle region therebetween according to an embodiment of the present disclosure includes: forming a pixel electrode in the display area and pad auxiliary electrodes in the pad region; forming a protection layer on the pixel electrode of the display area and on the middle region; coating a hydrophobic insulating material on the protection layer to form a water-repellent layer; and removing the water-repellent layer from the middle region.

The water-repellent layer may be formed on the protection layer by a slit coating method by moving a nozzle in one direction, while turning the nozzle on and off, and the water-repellent layer may be removed from the middle region by an edge bead removal (EBR) method which uses an electric bar to emit a plasma to remove the water-repellent layer. The electrode bar may be respectively positioned at upper, lower, right, and left surfaces of the display area.

The protection layer may include an organic material.

The method may further include, after forming the water-repellent layer, forming partitions with openings that define pixel areas in the display area.

The protection layer on the pixel electrode of the display area and in the middle region may be simultaneously formed with the partitions.

The partition and the protection layer may be made of an organic layer including a black pigment.

The method may further include forming color filters in the display area, and the protection layer on the pixel electrode of the display area and in the middle region may be simultaneously formed with the color filters.

The method may further include, after forming the water-repellent layer forming partitions with openings that define pixel areas in the display area.

The method may further include forming a black matrix in the display area, and the protection layer on the pixel electrode of the display area and in the middle region may be simultaneously formed with the black matrix.

The method may further include, after forming the water-repellent layer, forming partitions with openings that define pixel areas in the display area.

An electrowetting display device including a display area, a pad region, and a middle region therebetween according to an embodiment of the present disclosure includes: one or more pad auxiliary electrodes formed in the pad region; a pixel electrode formed in the display area; a water-repellent layer positioned on the pixel electrode; and a protection layer formed in the middle region that is formed of a the same material as a layer formed in the display area between the pixel electrode and the water-repellent layer.

The protection layer may be formed of the same material as an organic layer formed between the pixel electrode and the water-repellent layer.

The protection layer may be formed of the same material as a partition formed between the pixel electrode and the water-repellent layer.

The protection layer may be formed of the same material as a color filter formed between the pixel electrode and the water-repellent layer.

The protection layer may be formed of the same material as a black matrix formed between the pixel electrode and the water-repellent layer.

A method of manufacturing an electrowetting display device including a display area, a pad region, and a middle region therebetween according to an embodiment of the present disclosure includes: forming a pixel electrode in the display area and pad auxiliary electrodes in the pad region; coating a hydrophobic insulating material on the protection layer to form a water-repellent layer, wherein the water-repellent layer is formed by a slit coating method by moving a nozzle in one direction while turning the nozzle on and off; removing the water-repellent layer formed from the middle region; and forming partitions having openings that define pixel areas in the display area.

The method may further include, before forming the water-repellent layer, forming a protection layer of an organic material on the pixel electrode of the display area and on the middle region, wherein the protection layer is wider than the water-repellent layer.

The method may further include forming a protection layer on the pixel electrode of the display area and on the middle region when the partitions are formed, wherein the partitions and the protection layer are made of an organic layer comprising a black pigment.

The method may further include simultaneously forming color filters in the display area and a protection layer on the pixel electrode of the display area and in the middle region.

The method may further include simultaneously forming a black matrix in the display area and a protection layer on the pixel electrode of the display area and in the middle region.

As described above, in a manufacturing method of an electrowetting display device according to an embodiment of the present disclosure, a water-repellent layer is coated on the display area and the peripheral area by the slit coating method and then the water-repellent layer is removed from the peripheral area. The water-repellent layer of the display area may be uniformly coated. The water-repellent layer may be removed by an edge bead removal (EBR) method, and a protection layer is formed under the water-repellent layer to protect an underlying wiring to prevent deterioration of the operating characteristics.

BRIEF DESCRIPTION OF THE DRAWINGS

FIGS. 16 to 18 are photographs of damage generated in a lower layer in the absence of a protection layer in an EBR process.

DETAILED DESCRIPTION

Overview

Figure 1:
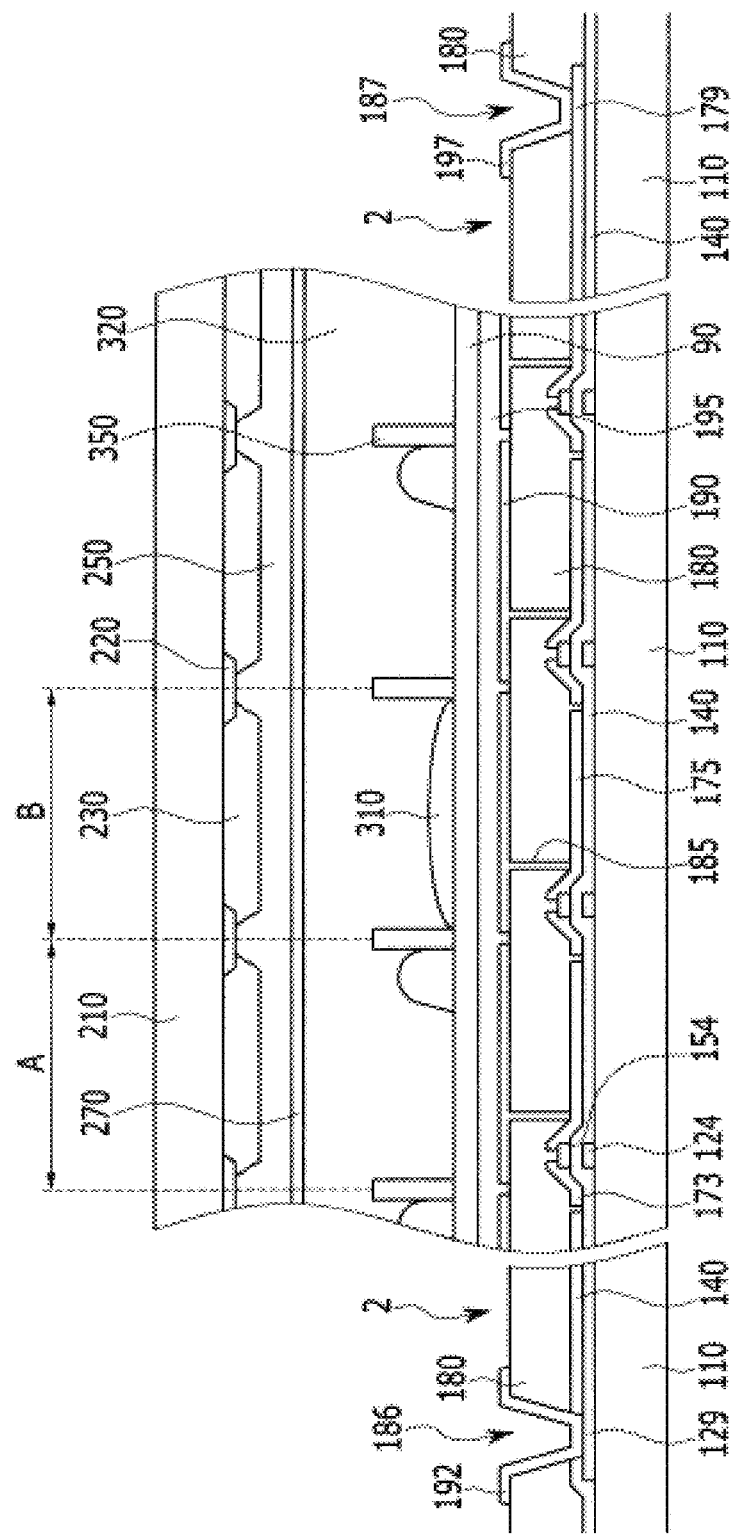
FIG. 1 is a cross-sectional view of an electrowetting display device according to an embodiment of the present disclosure.

Embodiments will be described more fully hereinafter with reference to the accompanying drawings, in which embodiments of the disclosure are shown. As those skilled in the art would realize, the described embodiments may be modified in various different ways, all without departing from the spirit or scope of the present disclosure.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present.

Now, an electrowetting display device according to embodiments of the present disclosure will be described with reference to the accompanying drawings.

Illustrative Environment

First, a display device according to an embodiment of the present disclosure will be described with reference to FIG. 1.

FIG. 1 is a cross-sectional view of an electrowetting display device according to an embodiment of the present disclosure.

As shown in FIG. 1, a transmissive type electrowetting display device according to an embodiment of the present disclosure includes a lower substrate 110 with a pixel electrode 190 formed thereon, an upper substrate 210 facing the lower substrate 110 with a common electrode 270 formed thereon, and electro-optic layers 310 and 320 positioned between the lower substrate 110 and the upper substrate 210. The lower substrate 110 includes partitions 350 that define a plurality of openings (spaces between partitions), the electro-optic layer 310 includes a black oil layer 310 disposed inside the openings of the partitions 350 and the electro-optic layer 320 includes an aqueous solution layer 320 positioned between the partitions 350 and the black oil layer 310, and the common electrode 270.

The lower substrate 110 and the upper substrate 210 may be flexible substrates made of glass, plastic, or a glass fiber reinforced plastic (FRP).

A gate electrode 124 and a gate extension 129 connected to a plurality of gate lines (not shown) extending in one direction are formed on the lower substrate 110. The gate extension 129 is a portion having an expanded width to receive a gate signal from a gate driver. A gate insulating layer 140 made of silicon nitride (SiNx) is formed on the gate electrode 124 and the gate extension 129.

A semiconductor layer 154 made of hydrogenated amorphous silicon is formed on the gate insulating layer 140. The semiconductor layer 154 forms a channel of the thin film transistor. A data line (not shown) and a drain electrode 175 are formed on the gate insulating layer 140 and the semiconductor layer 154. The data line extends in a direction perpendicular to the gate line thereby intersecting the gate line, and a branch extending from the data line includes a source electrode 173 and a data expansion 179 that is sufficiently wide to receive a data voltage from a data driver. At least portions of the source electrode 173 and the drain electrode 175 are positioned on the semiconductor layer 154, and they are separated from and opposite to each other with respect to the gate electrode 124.

An ohmic contact (not shown) is positioned between the semiconductor layer 154, and the source electrode 173 and the drain electrode 175, thereby reducing contact resistance therebetween.

An interlayer insulating layer 180 made of an insulating material such as silicon oxide, silicon nitride, or an organic material is formed on the source electrode 173, the drain electrode 175, the semiconductor layer 154, and the gate insulating layer 140. The interlayer insulating layer 180 includes a contact hole 185 exposing the drain electrode 175, a contact hole 186 exposing the gate extension 129, and a contact hole 187 exposing the data expansion 179.

The pixel electrode 190, a gate pad auxiliary electrode 192, and a data pad auxiliary electrode 197 are made of a transparent conductive material such as ITO (indium tin oxide) or IZO (indium zinc oxide) and are formed on the interlayer insulating layer 180.

The contact hole 186 exposing the gate extension 129 is formed in the gate insulating layer 140. The pixel electrode 190 is physically and electrically connected to the drain electrode 175 through the contact hole 185. The gate pad auxiliary electrode 192 is connected to the gate extension 129 through the contact hole 186 exposing the gate extension 129. Also, the data pad auxiliary electrode 197 is connected to the data expansion 179 through the contact hole 187 exposing the data expansion 179.

A protection layer 195 made of an organic material is formed on the pixel electrode 190. The protection layer 195 of the display area, referred to as an organic layer, may be excluded from a middle region 2 of the protection layer 195. The protection layer 195 is not formed on the gate pad auxiliary electrode 192 or the data pad auxiliary electrode 197. The protection layer 195 may cover and flatten steps between neighboring pixel electrodes 190.

A water-repellent layer 90 made of a hydrophobic insulating material is formed on the protection layer 195. The water-repellent layer 90 is formed on the protection layer 195, but not on the gate pad auxiliary electrode 192 or the data pad auxiliary electrode 197.

The partitions 350 are formed on the water-repellent layer 90. The partitions 350 have a matrix shape with openings that define the pixel areas, and may be formed of the organic layer and may include a black pigment.

The black oil layer 310 is formed on the water-repellent layer 90 between the openings of the partition 350.

In addition, a black matrix 220 having openings is formed under the upper substrate 210, and a color filter 230 is formed in the openings of the black matrix 220.

A planarization layer 250 is formed on the color filter 230 and the black matrix 220, and the common electrode 270 is formed under the planarization layer 250.

In addition, the aqueous solution layer 320 is formed between the partition 350 and the black oil layer 310, and the common electrode 270. The aqueous solution layer 320 does not mix with the black oil layer 310.

The surface tension of the aqueous solution layer 320 does not change in a pixel B having no electric field between the pixel electrode 190 and the common electrode 270, in which case the black oil layer 310 covers the entire corresponding pixel B. Accordingly, light incident from the lower side is not emitted from the upper side, thereby displaying black.

On the other hand, the surface tension of the aqueous solution layer 320 changes in a pixel A when an electric field is created between the pixel electrode 190 and the common electrode 270, in which case the black oil layer 310 accumulates together, opening pixel A. Accordingly, light incident from the lower side is emitted from the upper side, thereby displaying a color according to the color filter 230 in the pixel.

According to an embodiment, the color filter 230 may be omitted. When a flat panel display according to embodiments does not include a color filter 230, the pixel A displays a grayscale value such that the flat panel display functions as a black and white display device.

In addition, according to an embodiment, the gate driver may be integrally formed with the gate pad auxiliary electrode 192. In this embodiment, the gate driver is formed in the same process in which the display area is formed, and the gate line does not need to form the gate extension 129 and may connect directly to the gate driver. In this case, the gate pad auxiliary electrode 192 may be omitted, and the contact hole 186 exposing the gate extension 129 may also be omitted.

Hereafter, the pad auxiliary electrode may mean the gate pad auxiliary electrode 192 and the data pad auxiliary electrode 197, and is one auxiliary electrode when either of the gate pad or data pad auxiliary electrodes is omitted.

Next, referring to FIGS. 2 to 6 and FIG. 1, a manufacturing method of an electrowetting display device according to an embodiment of the present disclosure will be sequentially described.

FIG. 2 to FIG. 6 are cross-sectional views of the manufacturing steps of an electrowetting display device according to an embodiment of FIG. 1.

Figure 2:
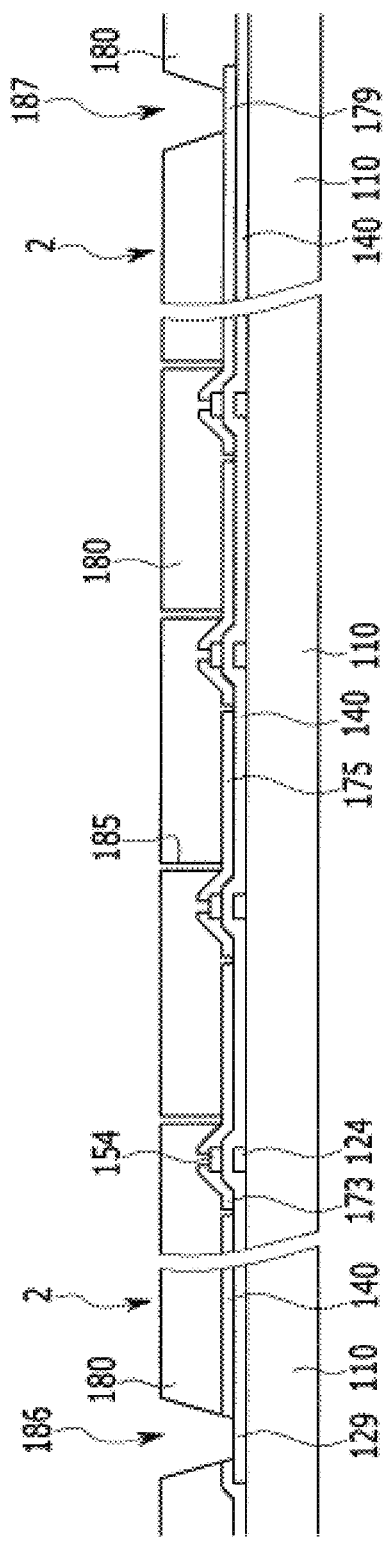
FIGS. 2 to 6 are cross-sectional views of the manufacturing steps of an electrowetting display device according to an embodiment of FIG. 1.

First, referring to FIG. 2, a gate line including a gate electrode 124 and a gate extension 129, a gate insulating layer 140, a semiconductor layer 154, a data line including a source electrode 173 and a data expansion 179, and a drain electrode 175 are sequentially formed on a lower substrate 110, and an interlayer insulating layer 180 is deposited to cover them.

Next, a contact hole 185 exposing the drain electrode 175, a contact hole 186 exposing the gate extension 129, and a contact hole 187 exposing the data expansion 179 are formed in the interlayer insulating layer 180.

Figure 3:
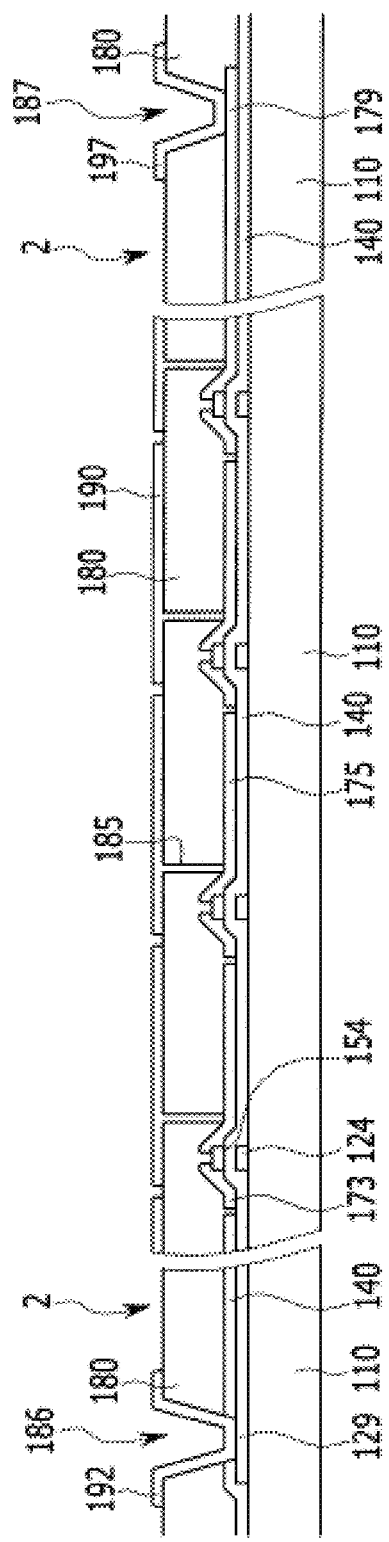

Next, as shown in FIG. 3, a transparent conductive material such as ITO (indium tin oxide) or IZO (indium zinc oxide) is deposited and patterned to form a pixel electrode 190, a gate pad auxiliary electrode 192, and a data pad auxiliary electrode 197. The pixel electrode 190 is connected to the drain electrode 175 through the contact hole 185 exposing the drain electrode 175. The gate pad auxiliary electrode 192 is connected to the gate extension 129 through the contact hole 186 exposing the gate extension 129, and the data pad auxiliary electrode 197 is connected to the data expansion 179 through the contact hole 187 exposing the data expansion 179.

Figure 4:
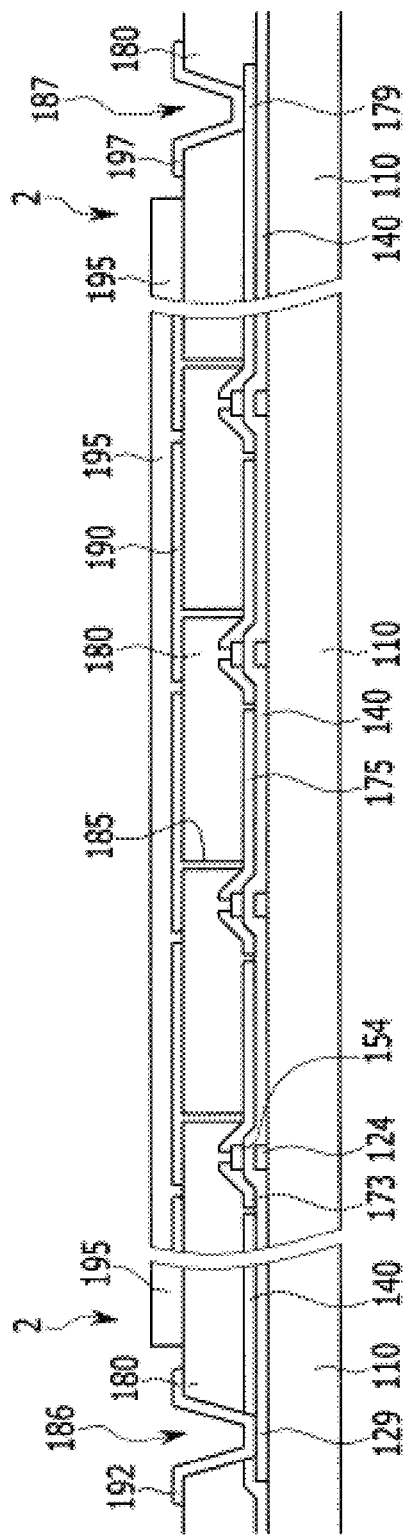

Next, as shown in FIG. 4, a protection layer 195 is formed. The protection layer of FIG. 4 is formed of an organic material and is thereby referred to as an organic protection layer. The organic material may be deposited on the entire region and patterned to expose the gate pad auxiliary electrode 192 and the data pad auxiliary electrode 197, or may be deposited on the entire region except for the gate pad auxiliary electrode 192 and the data pad auxiliary electrode 197. That is, the protection layer 195 is also formed in a middle region 2 between the display area displaying the image and a pad region where the gate pad auxiliary electrode 192 and the data pad auxiliary electrode 197 are formed. That is, the protection layer 195 is formed in the display area and the middle region 2, but not in the pad region.

Figure 5:
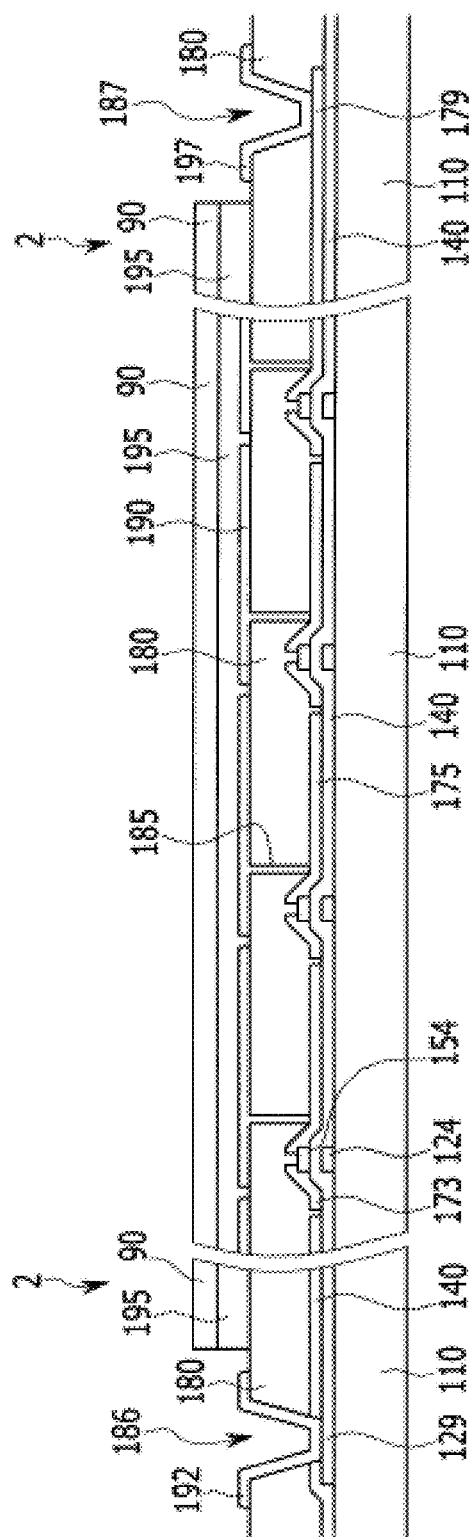

Next, as shown in FIG. 5, a water-repellent layer 90 is formed by a slit coating method on the protection layer 195. The water-repellent layer 90 is coated in the display area and the middle region 2 covered by the protection layer 195, but not in the pad regions on the gate pad auxiliary electrode 192 and the data pad auxiliary electrode 197. For this purpose, the slit on/off is controlled. Although FIG. 5 depicts the end of the protection layer 195 and the water-repellent layer 90 as coinciding with each other, other embodiments of the present disclosure are not limited thereto. The water-repellent layer 90 is hydrophobic, so that it is challenging to form an overlying layer, the result of which is that it is challenging to form a seal member. Accordingly, the protection layer 195 may be formed wider than the water-repellent layer 90.

Figure 6:
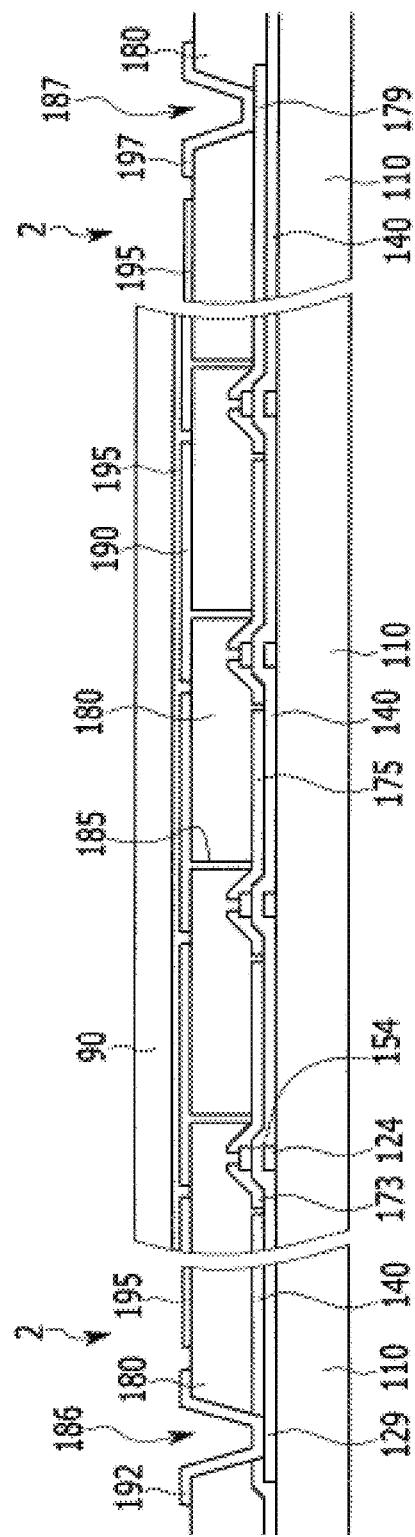

Next, as shown in FIG. 6, the water-repellent layer 90 is removed from the middle region 2. In a present embodiment, the water-repellent layer 90 is removed by an edge bead removal (EBR) method. The edge bead removal (EBR) method etches the edge layer by emitting plasma in an electrode bar (see item 15 of FIG. 12). At this time, the water-repellent layer 90 of the middle region is totally removed by the edge bead removal (EBR) method, however the underlying protection layer 195 may be etched or maintained.

Next, the slit coating method and the edge bead removal (EBR) method will be described.

First, the slit coating method is described with reference to FIG. 7 to FIG. 11.

Figure 7:
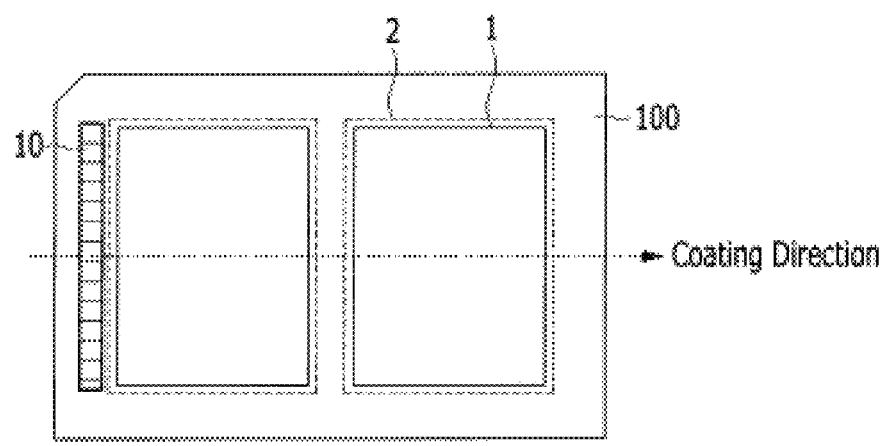
FIG. 7 illustrates a shape of a water-repellent layer coated by a slit coating method in an electrowetting display device according to an embodiment of the present disclosure.

FIG. 7 illustrates a shape of a water-repellent layer coated by a slit coating method in an electrowetting display device according to an embodiment of the present disclosure, and FIGS. 8 to 11 illustrate three experimental examples of thickness variations of the water-repellent layer according to a slit coating direction.

FIG. 7 illustrates the slit coating method.

FIG. 7 shows a case in which two display areas 1 are formed on a mother substrate 100.

A nozzle 10 discharges the hydrophobic insulating material under control of an on/off operation. If the hydrophobic insulating material is discharged, the water-repellent layer 90 is coated on the mother substrate 100, and if the hydrophobic insulating material is not discharged, the water-repellent layer 90 is not formed.

Also, the coating is formed while the nozzle 10 moves in one direction (hereinafter referred to as a coating direction), and the formation of the water-repellent layer 90 is controlled by the on/off operation of the nozzle 10 during the movement. In addition, a shim (not shown) is formed in the nozzle 10 that can uniformly coat the water-repellent layer 90 in a direction perpendicular to the coating direction.

The water-repellent layer 90 should be formed in the display area 1, however it is challenging to uniformly coat the water-repellent layer 90 in the display area 1 by the slit coating method without also coating the water-repellent layer 90 in the middle region 2 of the peripheral area of the display area 1.

In FIGS. 8 to 11, the slit coating direction and thickness uniformity of the water-repellent layer formed thereon are described.

Figure 8:
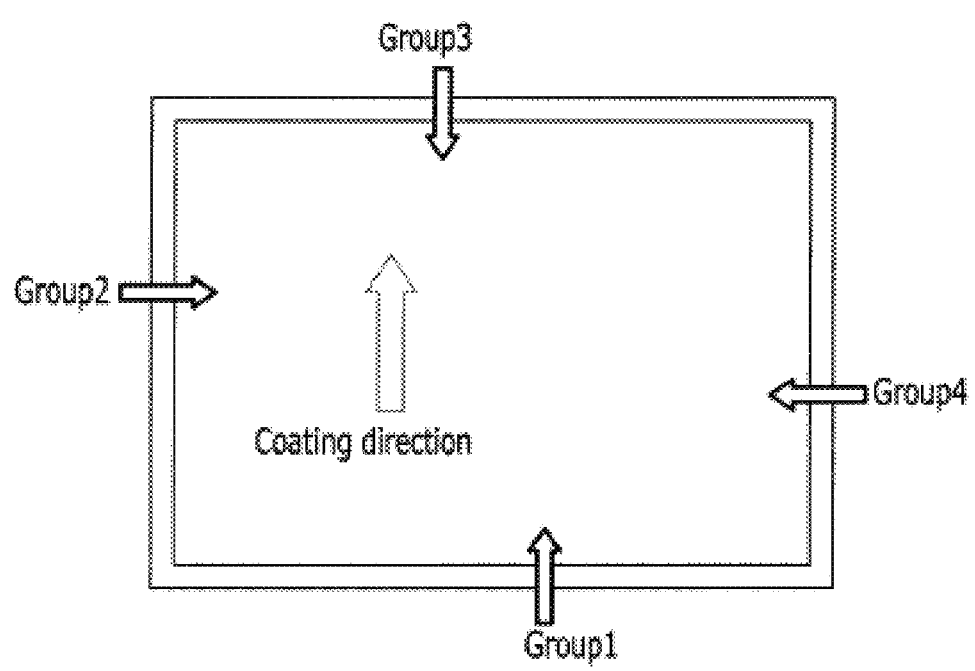
FIGS. 8 to 11 illustrate three experimental examples of different slit coating directions of the water-repellent layer.

First, as shown in FIG. 8, after slit coating the water-repellent layer 90 at 20 μm in the coating direction indicated in the figure, the thickness variations at four ends, denoted by group 1, group 2, group 3, and group 4 in the figure, are described.

Figure 9:
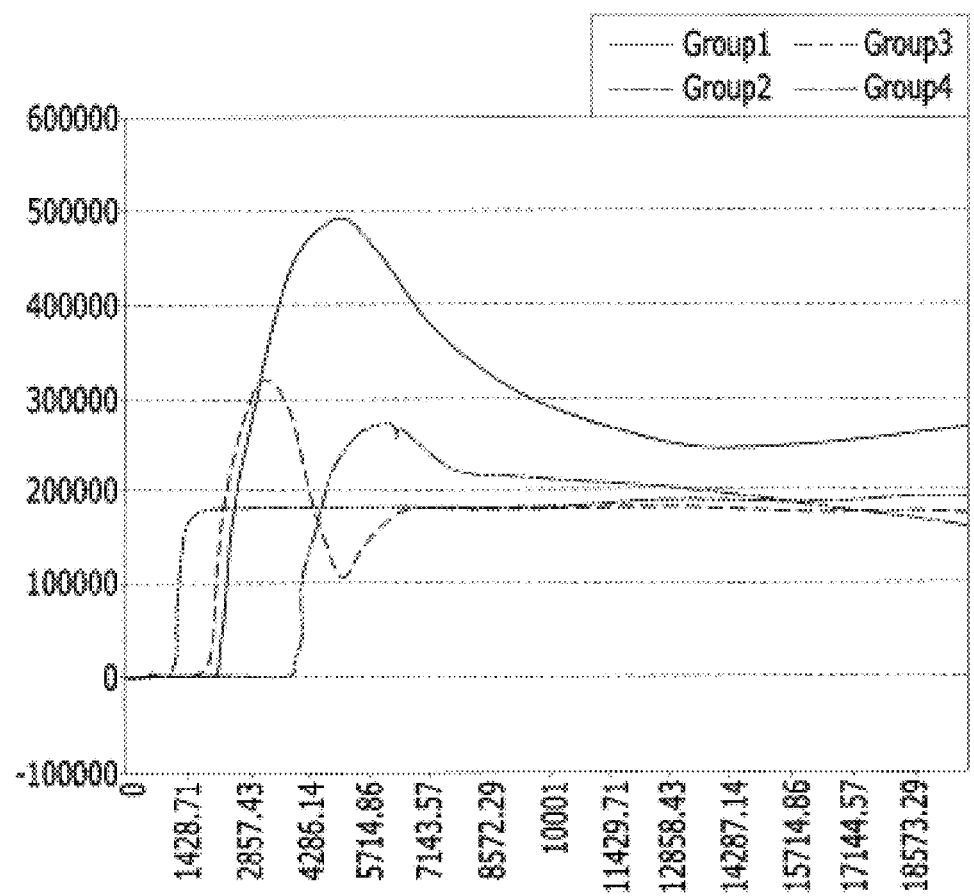
Figure 10:
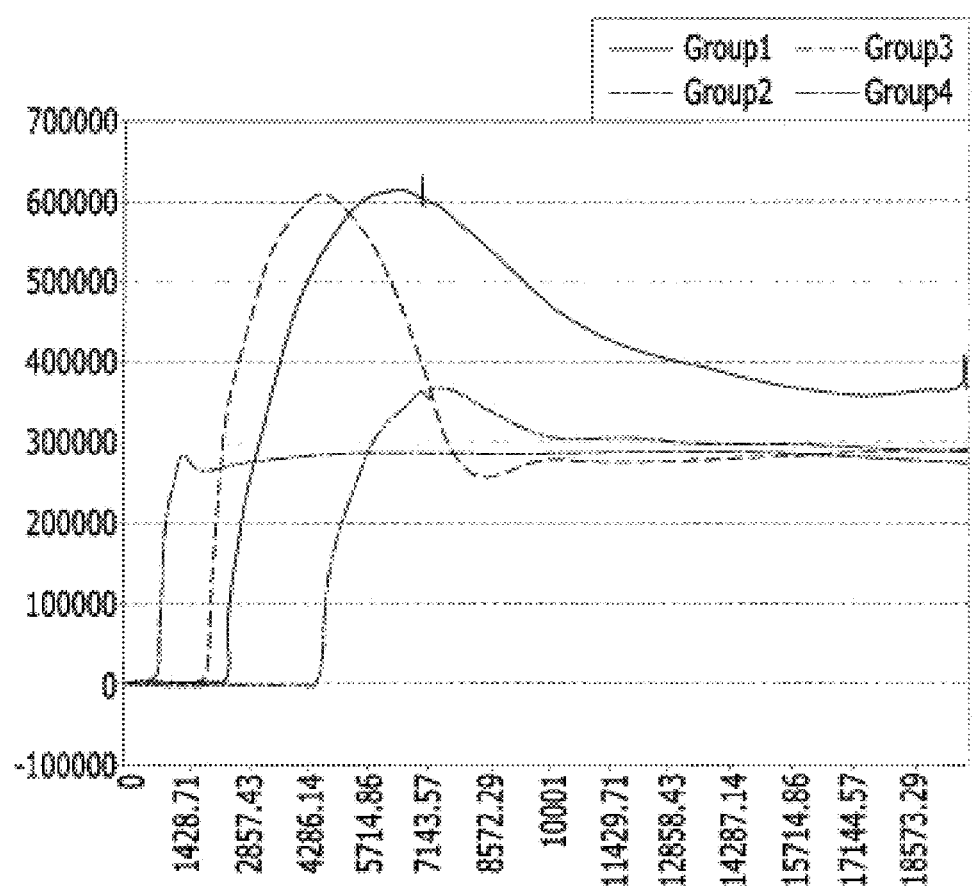
Figure 11:
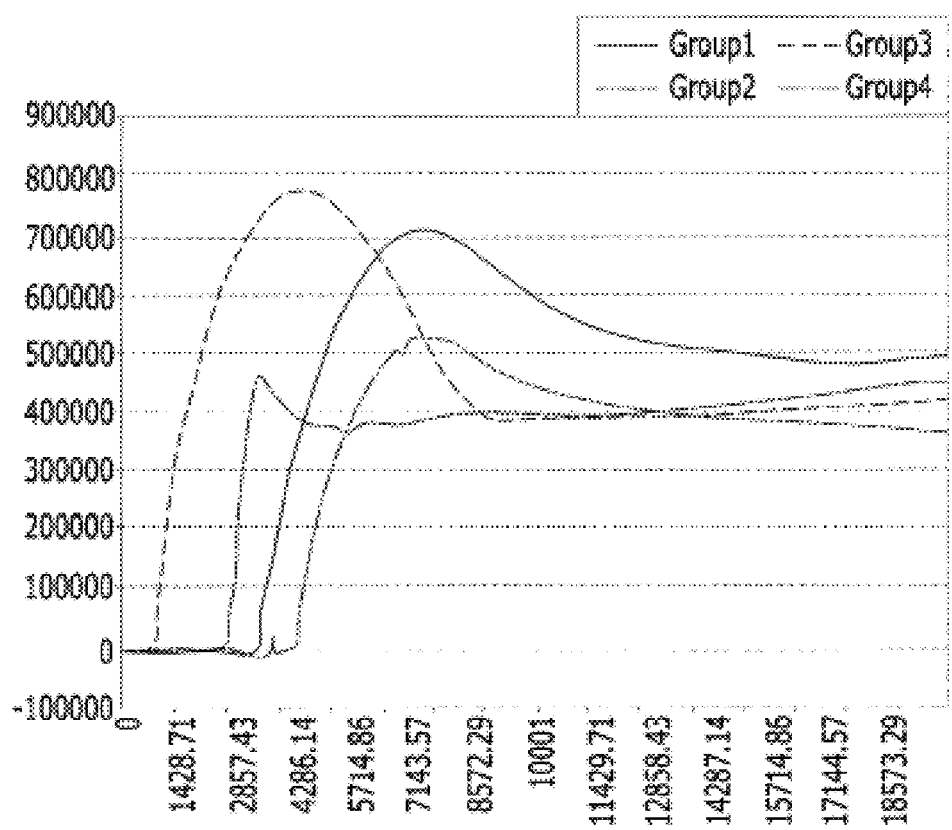

FIGS. 9 to 11 illustrate three experimental examples, in which the vertical axis represents a thickness in Å and the horizontal axis represents a distance from the coating area edge in FIGS. 9 to 11 show that the largest thickness variation occurs at the edges of the coating area, and a non-uniform coating region having the greatest variations in coating thickness exists within a range of 2 mm to 10 mm from the edges of the coating area. By controlling the slit coating, according to an embodiment, the water-repellent layer may be removed from the region 2 mm to 10 mm from the edges of the coating area. In the experimental examples, most of thickness variations occur in the region from 2 mm to 7 mm from the edge. Thus, the water-repellent layer may be removed from the region to at least 7 mm. In addition, to remove the entire non-uniform coating region, the water-repellent layer may be removed from the region to 15 mm, since the Group 1 graph of FIGS. 9-11 does not have a uniform thickness before 15 mm.

Therefore, when forming the water-repellent layer 90 by a slit coating method, the non-uniform coating region should be positioned in the middle region 2, not the display area 1 where the coated water-repellent layer 90 should be formed with a uniform thickness. However, maintaining the non-uniform coating region can widen the middle region 2, increasing the distance between the display area 1 and the pad region and wasting space. However in an embodiment of the present disclosure, the water-repellent layer 90 in the non-uniform coating region may be removed by the edge bead removal (EBR) method.

Next, the edge bead removal (EBR) method will be described with reference to FIGS. 12 to 18.

Figure 12:
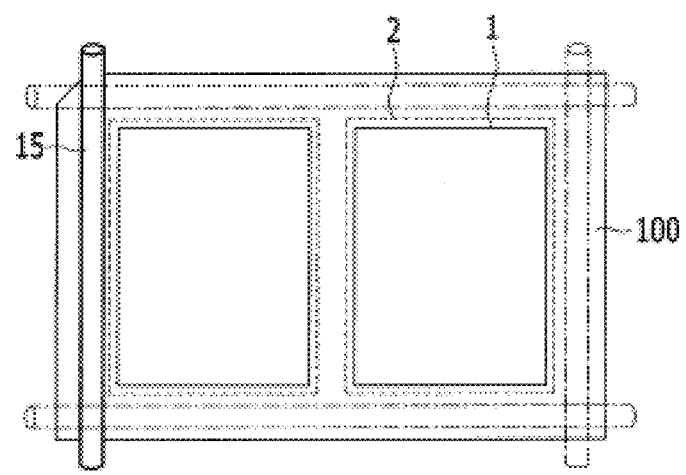
FIG. 12 illustrates a shape when partially removing a water-repellent layer coated through an EBR in an electrowetting display device according to an embodiment of the present disclosure.
Figure 13:
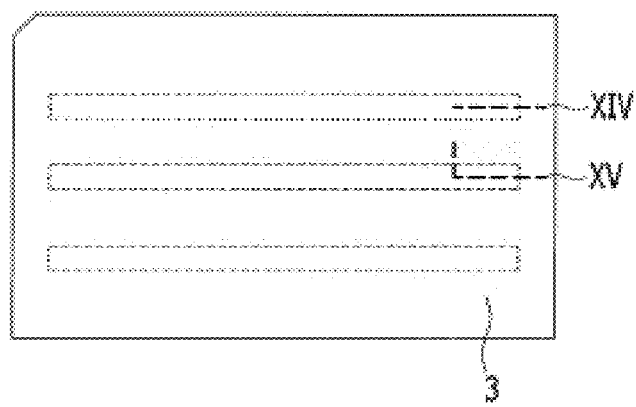
FIGS. 13 to 15 illustrate thickness variations of a water-repellent layer removed by an EBR.
Figure 14:
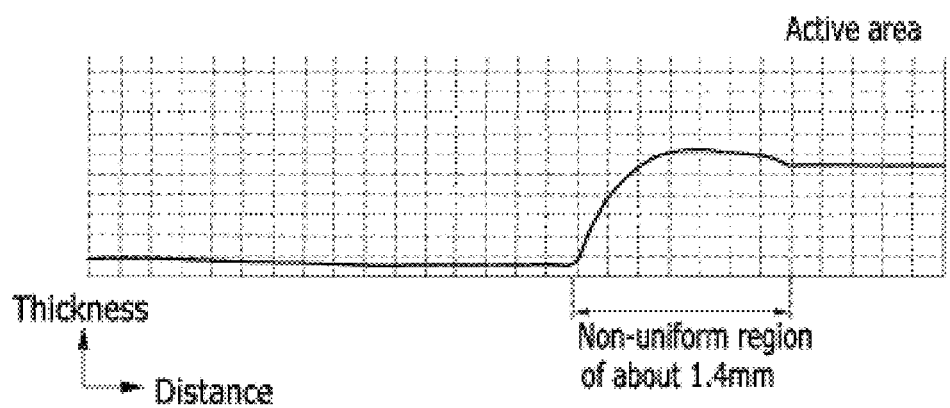
Figure 15:
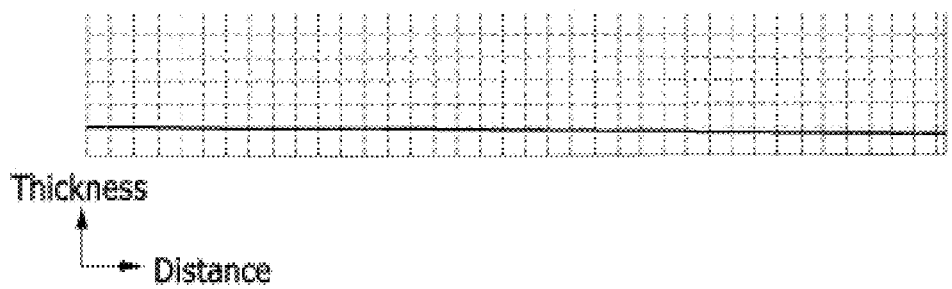
Figure 16:
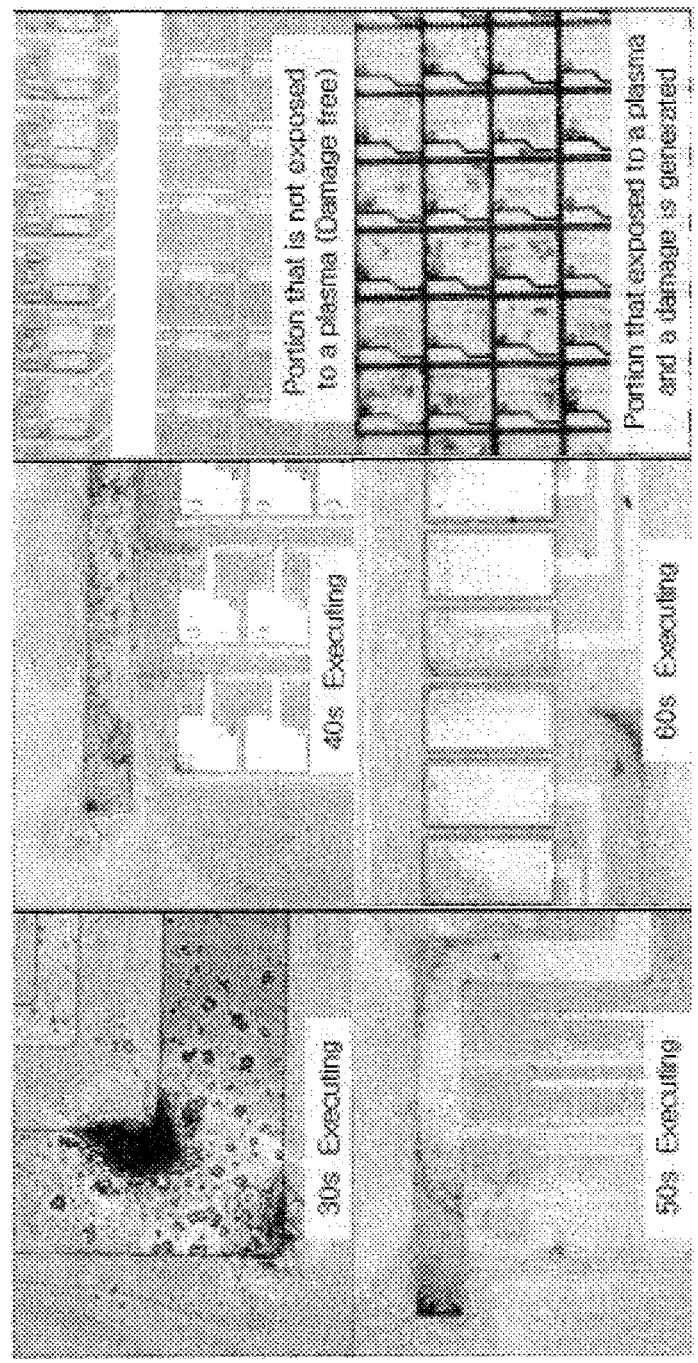
Figure 18:
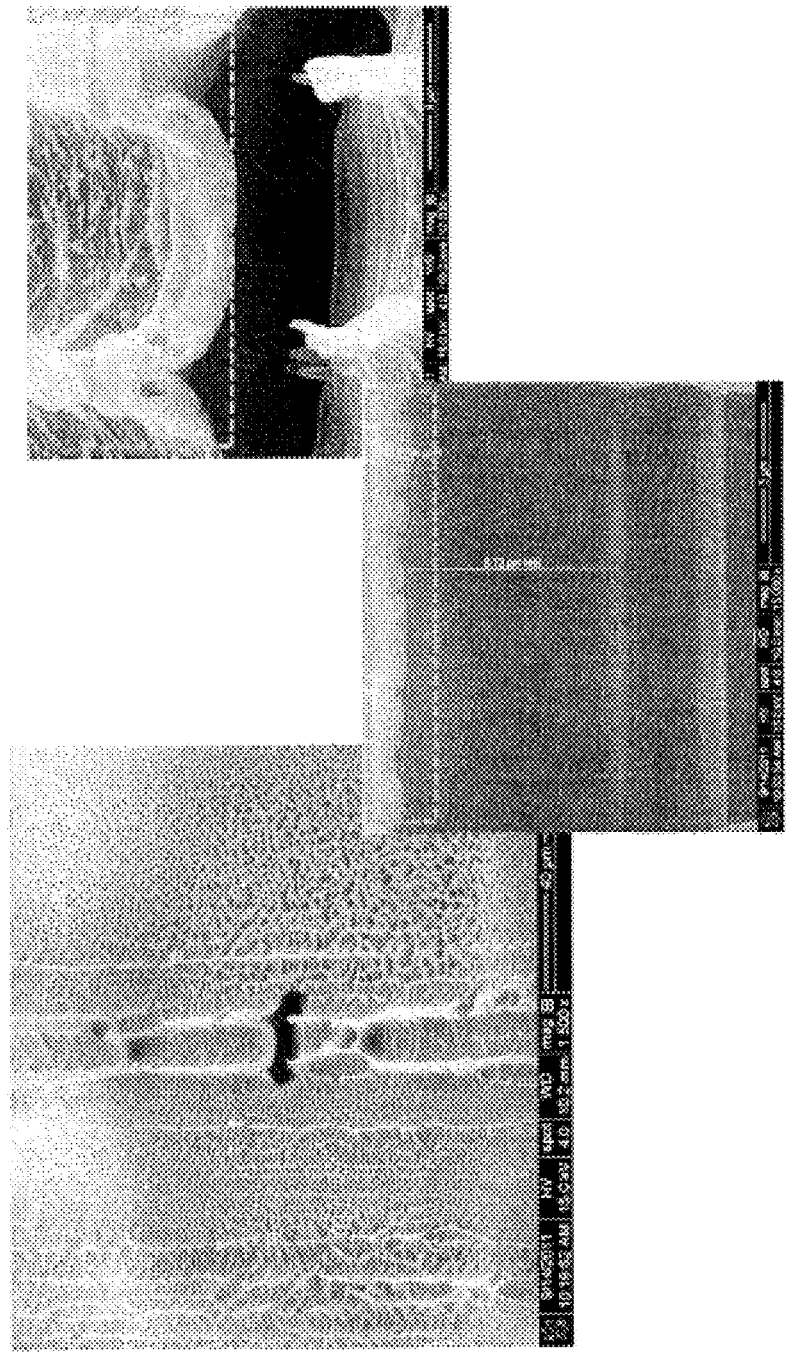

FIG. 12 illustrates a shape when partially removing a coated water-repellent layer using an EBR method in an electrowetting display device according to an embodiment of the present disclosure, FIGS. 13 to 15 illustrate a thickness of a water-repellent layer removed by the EBR method, and FIGS. 16 to 18 are photographs of damage generated in a lower layer by an EBR process in the absence of a protection layer.

FIG. 12 shows a method of etching using the edge bead removal (EBR) method.

FIG. 12 shows a case in which two display areas 1 are formed on the mother substrate 100. To remove the non-uniform coating region of the water-repellent layer 90, an electrode bar 15 is respectively positioned at each of the upper, lower, right, and left regions adjacent each display area 1 and the surrounding water-repellent layer 90 is removed. In FIG. 12, to represent all electrode bars 15 in the four regions, one electrode bar 15 is indicated by a solid line and the rest are indicated by dotted lines.

Plasma is emitted from the electrode bar 15 to etch the surrounding layer, and for a wide layer, the etching may be performed while moving the electrode bar 15. The etching may also etch the underlying layer, for example, the protection layer 195, of the water-repellent layer 90.

FIG. 13 illustrates an experiment in which, after depositing the water-repellent layer 90, three etching regions 3 are formed by the edge bead removal (EBR) method. The thickness of the water-repellent layer 90 according thereto will be described as follows with reference to FIGS. 14 and 15.

That is, the electrode bar 15 is positioned at three positions in the uniform water-repellent layer 90 and the etching is performed at these positions to form the etching regions 3. The thicknesses thereof are scanned according to lines XIV and XV. FIG. 14 and FIG. 15 are thickness graphs obtained by scanning the thickness according to the lines XIV and XV, respectively.

First, in FIG. 15, a uniform thickness is maintained in the etching region 3. That is, it may be confirmed that the water-repellent layer 90 may be uniformly etched by the edge bead removal (EBR) method, and the etching depth may be controlled by controlling an etching time of the edge bead removal (EBR).

Alternatively, in FIG. 14, it may be confirmed that the etched thickness of the edge of the water-repellent layer 90 is non-uniform in the range of about 1.4 mm. Therefore, the water-repellent layer 90 may be etched at a distance of about 1.4 mm from the display area 1.

The edge bead removal (EBR) method uses plasma to quickly remove the water-repellent layer 90, however the layer under the water-repellent layer 90 may be damaged.

FIG. 16 to FIG. 18 are photographs of damage generated in a lower layer when etching using the edge bead removal (EBR) method.

First, in FIG. 16, when etching using edge bead removal (EBR) without the protection layer 195, it may be confirmed that wiring exposed to the plasma is damaged, and a portion not exposed to the plasma is not damaged.

FIG. 17 shows a result of three cases: (1) no protection layer; (2) a thin protection layer; and (3) a thick protection layer. The thin protection layer is about 4 μm thick, and the thick protection layer is more than about 6 μm thick.

First, in FIG. 17, when etching using the edge bead removal (EBR) method in the conditions illustrated at the left side of the drawing, it may be confirmed that the lower layer is damaged in the absence of a protection layer.

Next, in FIG. 17, when there is a thin protection layer or a thick protection layer, a scorched shape may be confirmed. FIG. 18 is a photograph of a surface and a cross-section in the case of a thin protection layer. As shown in FIG. 18, a 4 μm thin protection layer notwithstanding, the protection layer 195 may be damaged, although the lower layer is not damaged.

Therefore, the protection layer 195 is required when using the edge bead removal (EBR) method, and if the thickness thereof is more than about 4 μm, the lower layer may not be damaged.

A photograph of the lower substrate of an electrowetting display device manufactured by the above-described method and the display area 1, the middle region 2, and the pad regions 129 and 179 will be described with reference to FIG. 19.

Figure 19:
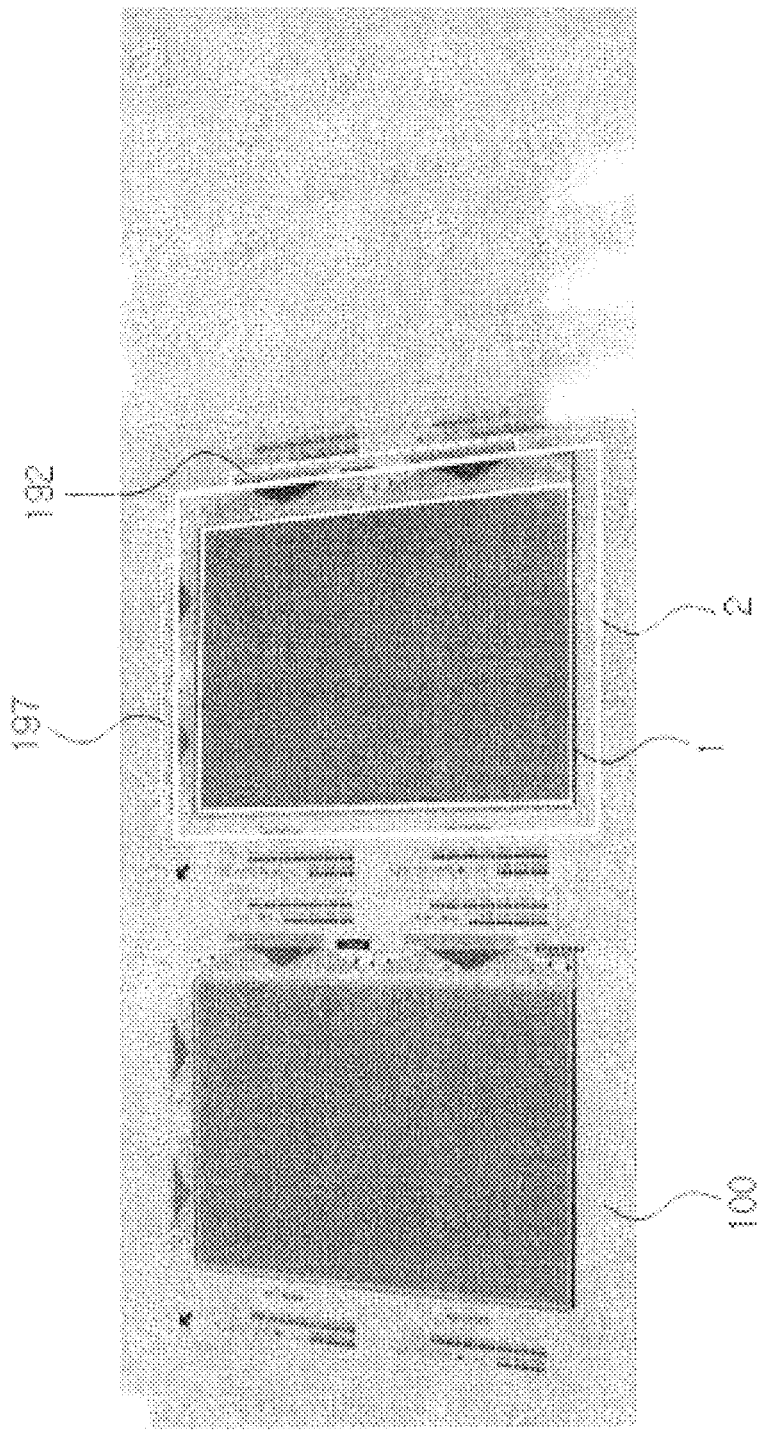
FIG. 19 is a photograph of an electrowetting display device manufactured according to an embodiment of the present disclosure.

FIG. 19 is a photograph of an electrowetting display device manufactured according to an embodiment of the present disclosure.

FIG. 19 shows two display areas 1 formed on the mother substrate 100, and a pad region including the gate pad auxiliary electrode 192 and the data pad auxiliary electrode 197, the display area 1, and the middle region 2 positioned therebetween are shown. The pad region with the gate pad auxiliary electrode 192 and the data pad auxiliary electrode 197 surrounds the middle region 2.

The middle region 2 is where the water-repellent layer 90 coated by the slit coating has been removed, and may have a width of at least 7 mm. Also, since the water-repellent layer 90 etched by the edge bead removal (EBR) method has a non-uniform thickness for about 1.4 mm from the edge, about 1.4 mm of the water-repellent layer 90 may be positioned outside the display area 1. In general, in a region having a constant thickness, a signal wire may be included near the display area 1 such that about 1.4 mm of the water-repellent layer 90 may be easily positioned outside the display area 1.

In the above, the protection layer 195 is formed as an organic protection layer, however a protection layer 195 formed by other methods will be described.

First, the protection layer 195 in FIG. 20 to FIG. 23 is formed along with the partition 350.

Figure 20:
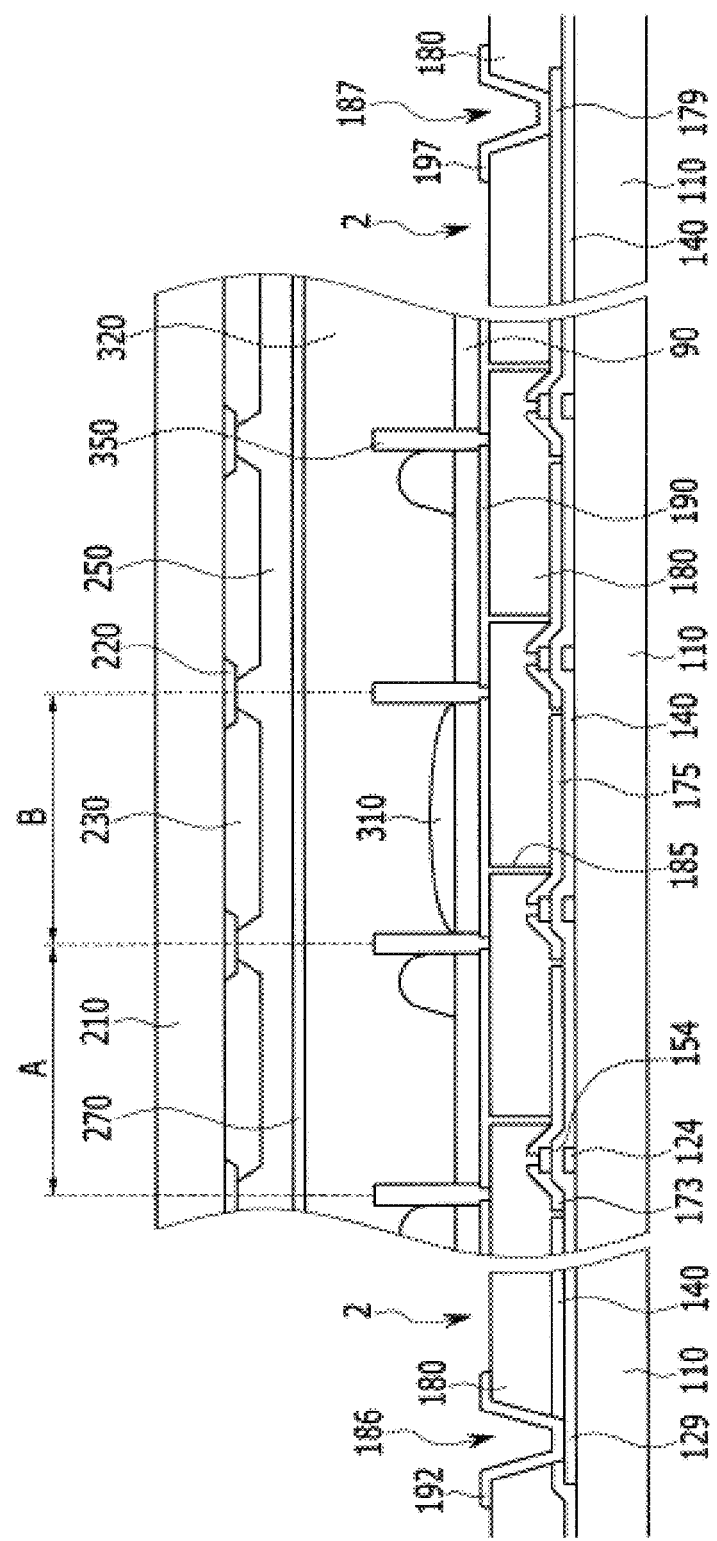
FIG. 20 is a cross-sectional view of an electrowetting display device according to another embodiment of the present disclosure.

FIG. 20 is a cross-sectional view of an electrowetting display device according to another embodiment of the present disclosure.

As shown in FIG. 20, a transmissive type electrowetting display device according to an embodiment of the present disclosure includes a lower substrate 110, with a pixel electrode 190 formed thereon, an upper substrate 210 facing the lower substrate 110 with a common electrode 270 formed thereon, and electro-optic layers 310 and 320 positioned between the lower substrate 110 and the upper substrate 210. The lower substrate 110 includes partitions 350 that define a plurality of openings (a space between partitions), the electro-optic layer 310 includes a black oil layer 310 disposed inside the openings of the partition 350 and the electro-optic layer 320 includes an aqueous solution layer 320 positioned between the partitions 350 and the black oil layer 310, and the common electrode 270.

The lower substrate 110 and the upper substrate 210 may be flexible substrates made of glass, plastic, or a glass fiber reinforced plastic (FRP).

Gate electrodes 124 and gate extensions 129 connected to a plurality of gate lines extending in one direction are formed on the lower substrate 110. The gate extension 129 is a portion having an expanded width to receive a gate signal from a gate driver.

A gate insulating layer 140 made of silicon nitride (SiNx) is formed on the gate electrode 124 and the gate extension 129.

A semiconductor layer 154 made of hydrogenated amorphous silicon is formed on the gate insulating layer 140. The semiconductor layer 154 forms the channel of the thin film transistor. A data line (not shown) and a drain electrode 175 are formed on the gate insulating layer 140 and the semiconductor layer 154. The data line extends in a direction perpendicular to the gate line thereby intersecting the gate line, and a branch extending from the data line includes the source electrode 173 and the data expansion 179 that is sufficiently wide to receive a data voltage from a data driver. At least portions of the source electrode 173 and the drain electrode 175 are positioned on the semiconductor layer 154, and they are separated from and opposite to each other with respect to the gate electrode 124.

An ohmic contact (not shown) is positioned between the semiconductor layer 154, and the source electrode 173 and the drain electrode 175, thereby reducing contact resistance therebetween.

An interlayer insulating layer 180 made of an insulating material such as silicon oxide, silicon nitride, or an organic material is formed on the source electrode 173, the drain electrode 175, the semiconductor layer 154, and the gate insulating layer 140. The interlayer insulating layer 180 includes a contact hole 185 exposing the drain electrode 175, a contact hole 186 exposing the gate extension 129, and a contact hole 187 exposing the data expansion 179. The contact hole 186 exposing the gate extension 129 is formed in the gate insulating layer 140.

A pixel electrode 190, a gate pad auxiliary electrode 192, and a data pad auxiliary electrode 197 made of a transparent conductive material such as ITO (indium tin oxide) or IZO (indium zinc oxide) are formed on the interlayer insulating layer 180.

The pixel electrode 190 is physically and electrically connected to the drain electrode 175 through the contact hole 185. The gate pad auxiliary electrode 192 is connected to the gate extension 129 through the contact hole 186 exposing the gate extension 129. In addition, the data pad auxiliary electrode 197 is connected to the data expansion 179 through the contact hole 187 exposing the data expansion 179.

Figure 22:
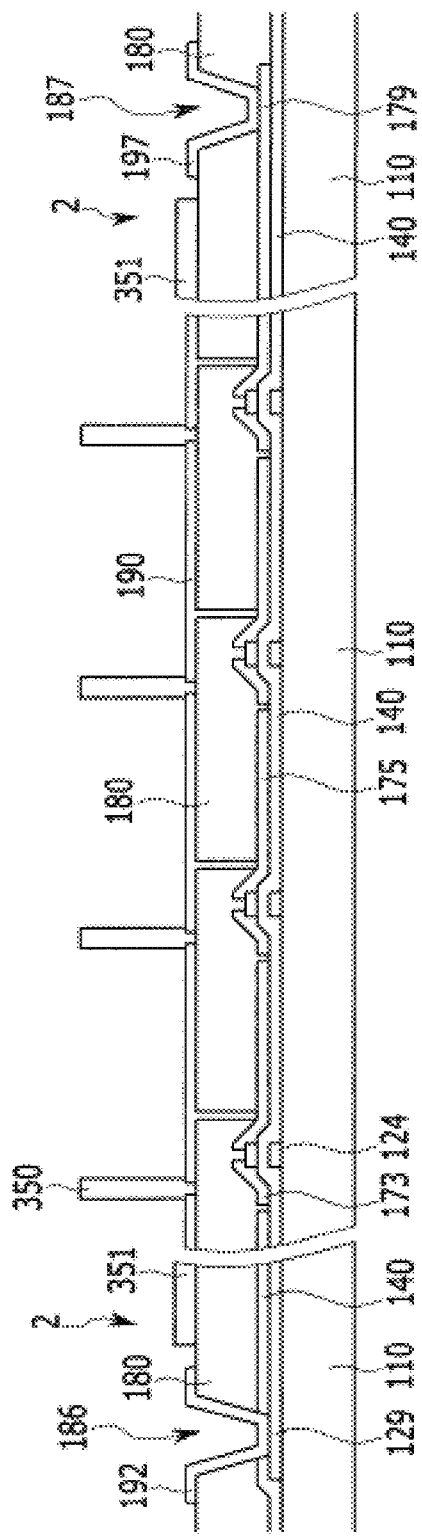
Figure 23:
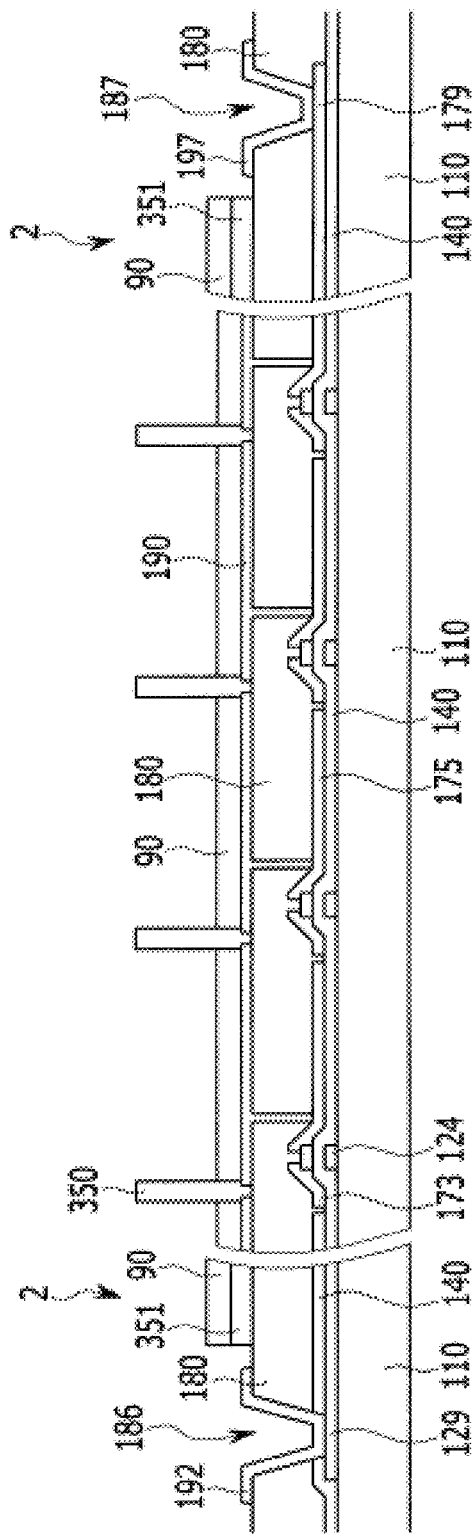

The partitions 350 are formed on the pixel electrode 190. The partitions 350 have a matrix shape having openings that define the pixel areas, and may be formed of an organic layer and may include a black pigment. A protection layer 351, shown in FIGS. 22 and 23, is also formed with the partition 350. The protection layer 351 may be formed of the same material as the partition 350, and may be removed from the middle region 2 by etching. The protection layer 351 is completely removed, and is thus not shown in FIG. 20, however the protection layer 351 may be partially removed from the middle region 2.

The water-repellent layer 90 is formed on the pixel electrode 190 between the openings of the partitions 350. The water-repellent layer 90 is formed of a hydrophobic insulating material. Referring to FIG. 23, the water-repellent layer 90 is also formed on the protection layer 351 in the middle region 2, however it is removed during the etching process. The water-repellent layer 90 is not formed on the gate pad auxiliary electrode 192 or the data pad auxiliary electrode 197.

The black oil layer 310 is formed on the water-repellent layer 90 between the openings of the partitions 350.

In addition, a black matrix 220 having openings is formed under the upper substrate 210, and color filters 230 are formed in the openings of the black matrix 220.

A planarization layer 250 is formed under the color filters 230 and the black matrix 220, and a common electrode 270 is formed under the planarization layer 250.

In addition, the aqueous solution layer 320 is formed between the partitions 350 and the black oil layer 310, and the common electrode 270. The aqueous solution layer 320 does not mix with the black oil layer 310.

According to an embodiment, the color filters 230 may be omitted. In addition, according to an embodiment, the gate driver may be integrally formed with the gate pad auxiliary electrode 192. In this embodiment, the gate driver is formed in the same process in which the display area is formed, and the gate line does not need to form the gate extension 129 and may connect directly to the gate driver. In this case, the gate pad auxiliary electrode 192 may be omitted, and the contact hole exposing the gate extension 129 may also be omitted.

Next, a manufacturing method of an electrowetting display device according to an embodiment of FIG. 20 will be described with reference to FIGS. 21 to 23.

Figure 21:
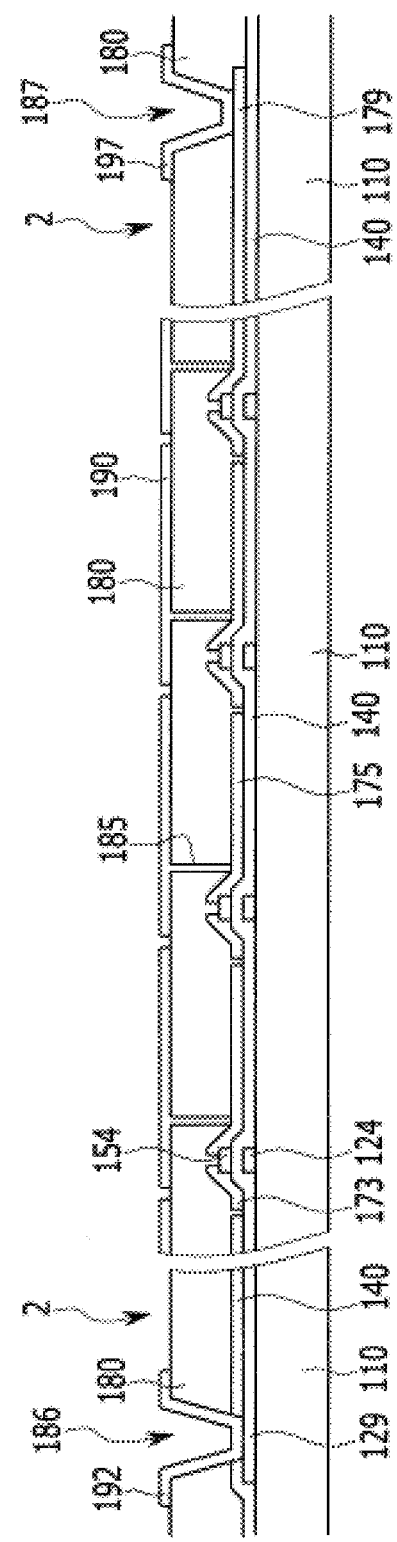
FIGS. 21 to 23 are cross-sectional views of the manufacturing steps of an electrowetting display device according to an embodiment of FIG. 20.

FIGS. 21 to 23 are cross-sectional views of the manufacturing steps of the electrowetting display device according to an embodiment of FIG. 20.

First, referring to FIG. 21, the a gate line including the gate electrode 124 and the gate extension 129, the gate insulating layer 140, the semiconductor layer 154, the data line including the source electrode 173 and the data expansion 179, and the drain electrode 175 are sequentially formed on the lower substrate 110, and the interlayer insulating layer 180 is deposited to cover them.

Next, the contact hole 185 exposing the drain electrode 175, the contact hole 186 exposing the gate extension 129, and the contact hole 187 exposing the data expansion 179 are formed in the interlayer insulating layer 180.

Next, a transparent conductive material such as ITO (indium tin oxide) or IZO (indium zinc oxide) is deposited and patterned to form the pixel electrode 190, the gate pad auxiliary electrode 192, and the data pad auxiliary electrode 197. The pixel electrode 190 is connected to the drain electrode 175 through the contact hole 185 exposing the drain electrode 175. The gate pad auxiliary electrode 192 is connected to the gate extension 129 through the contact hole 186 exposing the gate extension 129, and the data pad auxiliary electrode 197 is connected to the data expansion 179 through the contact hole 187 exposing the data expansion 179.

Next, as shown in FIG. 22, the protection layer 351 is formed along with the partitions 350. The protection layer 351 may be formed of the same material as the partition 350, and may be formed of the organic layer and may include the black dye. The protection layer 351 is formed differently the from the protection layer 195 of FIGS. 4 to 6, and is referred to as a partition protection layer 351. After coating the organic material for the partition 350 and the protection layer 351, an etching process is performed to create the openings between the partitions 350 which also removes the organic material from the gate pad auxiliary electrode 192 and the data pad auxiliary electrode 197. At this time, the protection layer 351 is also etched to be thinner than the partitions 350. The protection layer 351 is formed in the middle region 2 outside the display area 1 but not in the pad region. The thickness of the protection layer 351 may be more than about 4 μm.

Next, as shown in FIG. 23, the water-repellent layer 90 is formed on the protection layer 351 by the slit coating method. The water-repellent layer 90 is formed in the display area and the middle region 2, but not on the pad region where the gate pad auxiliary electrode 192 and the data pad auxiliary electrode 197 are positioned. For this purpose, the slit on/off switching is controlled. Although FIG. 23 shows the ends of the protection layer 351 and the water-repellent layer 90 as coinciding with each other, other embodiments of the present disclosure are not limited thereto. The water-repellent layer 90 is hydrophobic, so that it is challenging to form the overlying layer, the result of which is that it is challenging to from a seal member. Accordingly, the protection layer 351 may be formed wider than the water-repellent layer 90.

Next, as shown in FIG. 20, the water-repellent layer 90 and the protection layer 351 are removed from the middle region 2. In a present embodiment, the water-repellent layer 90 is removed by the edge bead removal (EBR) method. The edge bead removal (EBR) method emits plasma from the electrode bar 15 to etch the surrounding layer, and the electrode bar 15 is respectively positioned in the middle region 2 of the upper, lower, right, and left surfaces of the display area. At this time, the water-repellent layer 90 of the middle region is completely removed by the edge bead removal (EBR), however the underlying protection layer 351 may partially remain, different from that shown in FIG. 20.

Next, an embodiment of forming the color filter 230 together with the protection layer 231 will be described with reference to FIGS. 24 to 26.

Figure 24:
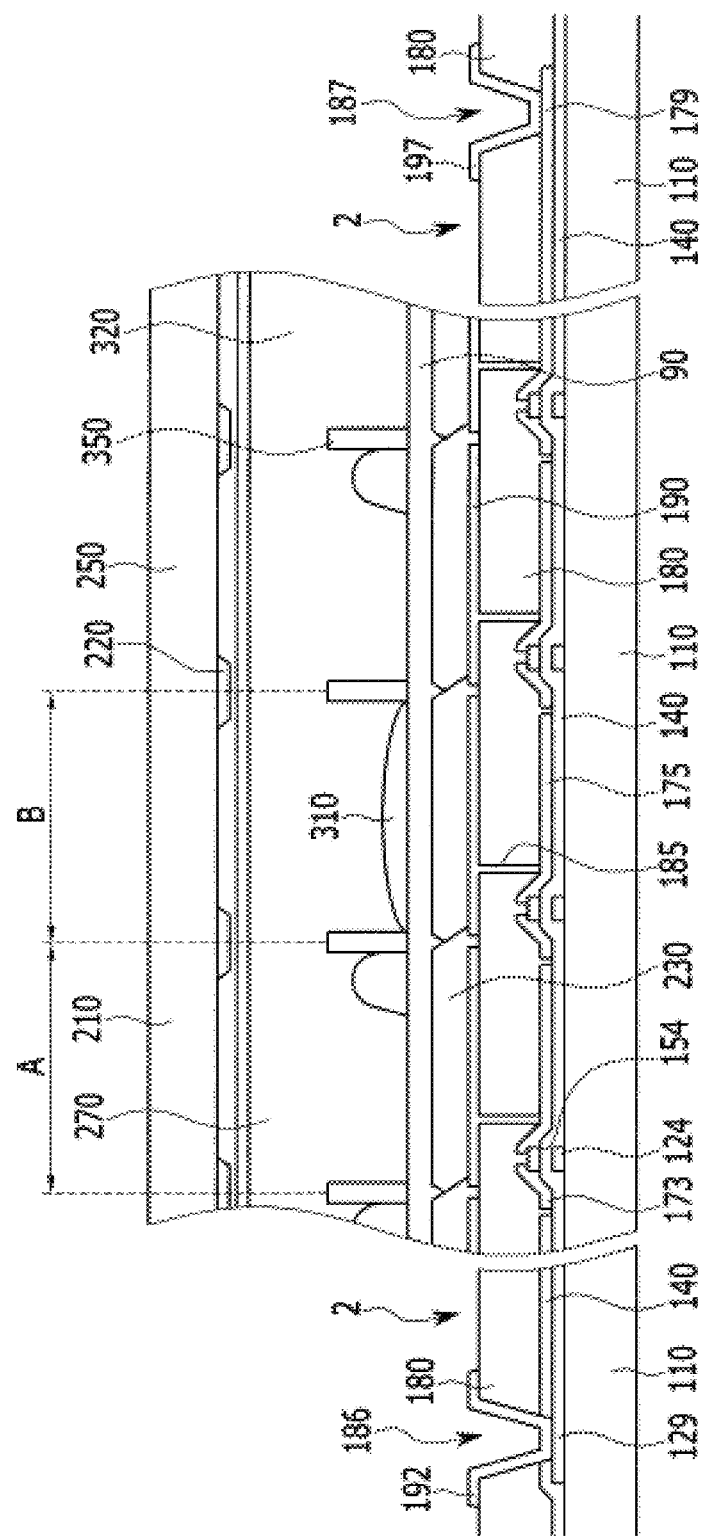
FIG. 24 is a cross-sectional view of an electrowetting display device according to another embodiment of the present disclosure.

FIG. 24 is a cross-sectional view of an electrowetting display device according to another embodiment of the present disclosure.

As shown in FIG. 24, a transmissive type electrowetting display device according to an embodiment of the present disclosure includes a lower substrate 110 with a pixel electrode 190 formed thereon, an upper substrate 210 facing the lower substrate 110 and with a common electrode 270 formed thereon, and electro-optic layers 310 and 320 positioned between the lower substrate 110 and the upper substrate 210. The lower substrate 110 includes partitions 350 that define a plurality of openings (spaces between partitions), the electro-optic layer 310 includes a black oil layer 310 disposed inside the openings of the partitions 350 and the electro-optic layer 320 includes an aqueous solution layer 320 positioned between the partition 350 and the black oil layer 310, and the common electrode 270.

The lower substrate 110 and the upper substrate 210 may be flexible substrates made of glass, plastic, or a glass fiber reinforced plastic (FRP).

Gate electrodes 124 and gate extensions 129 connected to a plurality of gate lines (not shown) extending in one direction are formed on the lower substrate 110. The gate extension 129 is a portion having an expanded width to receive a gate signal from a gate driver. A gate insulating layer 140 made of silicon nitride (SiNx) is formed on the gate electrode 124 and the gate extension 129.

A semiconductor layer 154 made of hydrogenated amorphous silicon is formed on the gate insulating layer 140. The semiconductor layer 154 forms the channel of the thin film transistor. A data line (not shown) and a drain electrode 175 are formed on the gate insulating layer 140 and the semiconductor layer 154. The data line extends in a direction perpendicular to the gate line thereby intersecting the gate line, and a branch extending from the data line includes a source electrode 173 and a data expansion 179 that is sufficiently wide to receive a data voltage from a data driver. At least portions of the source electrode 173 and the drain electrode 175 are positioned on the semiconductor layer 154, and they are separated from and opposite from each other with respect to the gate electrode 124.

An ohmic contact (not shown) is positioned between the semiconductor layer 154, and the source electrode 173 and the drain electrode 175, thereby reducing contact resistance therebetween.

An interlayer insulating layer 180 made of an insulating material such as silicon oxide, silicon nitride, or an organic material is formed on the source electrode 173, the drain electrode 175, the semiconductor layer 154, and the gate insulating layer 140. The interlayer insulating layer 180 includes a contact hole 185 exposing the drain electrode 175, a contact hole 186 exposing the gate extension 129, and a contact hole 187 exposing the data expansion 179. The contact hole 186 exposing the gate extension 129 is formed in the gate insulating layer 140.

A pixel electrode 190, a gate pad auxiliary electrode 192, and a data pad auxiliary electrode 197 made of a transparent conductive material such as ITO (indium tin oxide) or IZO (indium zinc oxide) are formed on the interlayer insulating layer 180.

The pixel electrode 190 is physically and electrically connected to the drain electrode 175 through the contact hole 185. The gate pad auxiliary electrode 192 is connected to the gate extension 129 through the contact hole 186 exposing the gate extension 129. In addition, the data pad auxiliary electrode 197 is connected to the data expansion 179 through the contact hole 187 exposing the data expansion 179.

Figure 25:
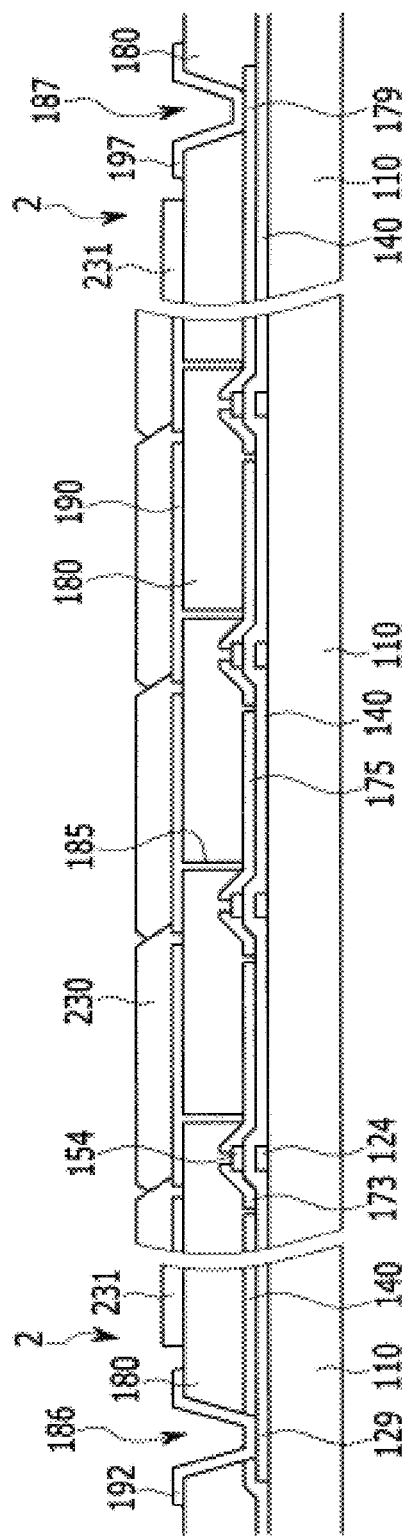
FIGS. 25 and 26 are cross-sectional views of the manufacturing steps of an electrowetting display device according to an embodiment of FIG. 24.
Figure 26:
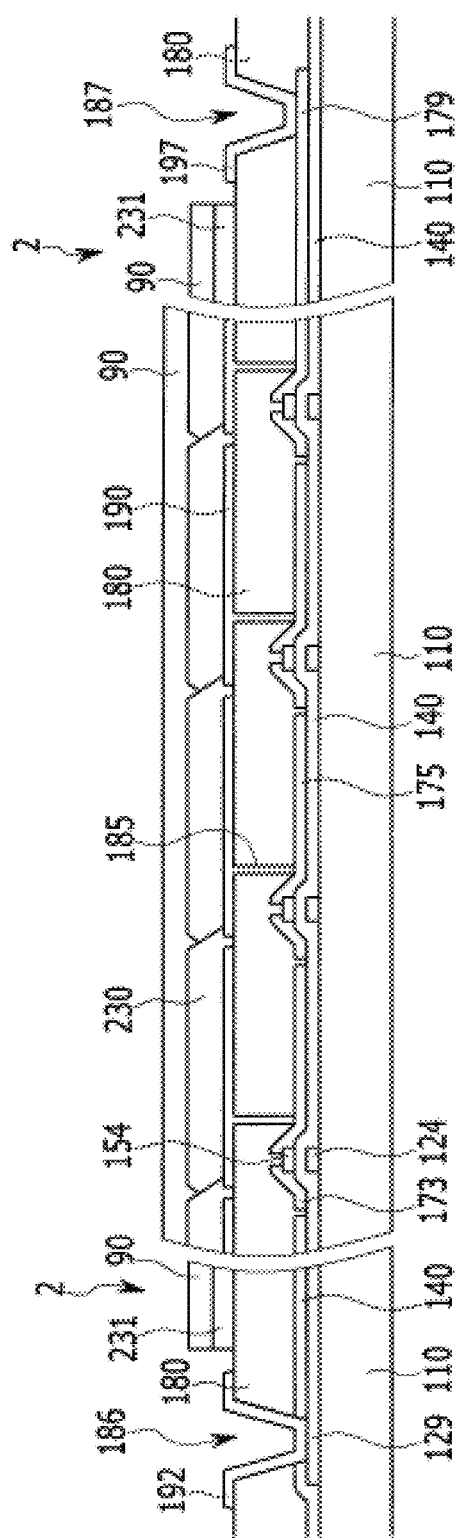

The color filters 230 are formed on the pixel electrode 190, and a protection layer 231, shown in FIGS. 25 and 26, is formed in the middle region 2 along with the color filters 230. The protection layer 231 may be formed of the same material as the color filters 230. However, the protection layer 231 may be removed from the middle region 2 by etching The color filters 230 and the protection layer 231 include pigments that transmit predetermined wavelengths or may be made of a quantum dot (semiconductor nanocrystal) material. A semiconductor quantum dot material has a crystalline structure the size of several nanometers and includes several hundred to several thousand atoms. Because of the small size thereof, it has a high surface area per unit volume so that quantum confinement effects appear. Accordingly, quantum dot semiconductors display unique physical and chemical characteristics that differ from the characteristics of the corresponding semiconductor material.

The water-repellent layer 90 is formed on the color filters 230. The water-repellent layer 90 is formed of a hydrophobic insulating material. Referring to FIG. 26, the water-repellent layer 90 is formed on the protection layer 231 in the middle region 2 and is then removed by an etching process. The water-repellent layer 90 is not formed on the gate pad auxiliary electrode 192 or the data pad auxiliary electrode 197.

The partitions 350 are formed on the water-repellent layer 90, and the black oil layer 310 is formed between the openings of the partitions 350.

In addition, the black matrix 220 is formed under the upper substrate 210.

The planarization layer 250 is formed under the black matrix 220, and the common electrode 270 is formed under the planarization layer 250.

In addition, the aqueous solution layer 320 is formed between the partitions 350 and the black oil layer 310, and the common electrode 270. The aqueous solution layer 320 does not mix with the black oil layer 310.

According to an embodiment, the gate driver may be integrally formed with the gate pad auxiliary electrode 192. At this time, the gate driver is formed in the same process in which the display area is formed, and the gate line does not need to form the gate extension 129 and may connect directly to the gate driver. In this case, the gate pad auxiliary electrode 192 may be omitted, and the contact hole 186 exposing the gate extension 129 may also be omitted.

Next, referring to FIGS. 25 and 26, a manufacturing method of an electrowetting display device according to an embodiment of FIG. 24 will be described.

FIG. 25 and FIG. 26 are cross-sectional views of the manufacturing steps of an electrowetting display device according to an embodiment of FIG. 24.

First, referring to FIG. 25, the gate line including the gate electrode 124 and the gate extension 129, the gate insulating layer 140, the semiconductor layer 154, the data line including the source electrode 173 and the data expansion 179, and the drain electrode 175 are sequentially formed on the lower substrate 110, and the interlayer insulating layer 180 is deposited to cover them.

Next, the contact hole 185 exposing the drain electrode 175, the contact hole 186 exposing the gate extension 129, and the contact hole 187 exposing the data expansion 179 are formed in the interlayer insulating layer 180.

Next, a transparent conductive material such as ITO (indium tin oxide) or IZO (indium zinc oxide) is deposited and patterned to form the pixel electrode 190, the gate pad auxiliary electrode 192, and the data pad auxiliary electrode 197. The pixel electrode 190 is connected to the drain electrode 175 through the contact hole 185 exposing the drain electrode 175. The gate pad auxiliary electrode 192 is connected to the gate extension 129 through the contact hole 186 exposing the gate extension 129, and the data pad auxiliary electrode 197 is connected to the data expansion 179 through the contact hole 187 exposing the data expansion 179.

Next, the protection layer 231 is formed along with the color filter 230. The protection layer 231 may be formed with the same material as the color filter 230, and may be formed with the color filter of one color or with overlapped color filters of two or more colors.

That is, in an embodiment of FIG. 24, the protection layer 231 is formed of the same material as the color filter, different from the protection layers 195 and 351 of FIGS. 1 and 20, respectively, and is referred to as a color filter protection layer 231. The color filter material is etched after coating to form the color filter 230 and to remove the color filter material from the gate pad auxiliary electrode 192 and the data pad auxiliary electrode 197. At this time, the protection layer 231 is also etched to be thinner than the color filter 230. The protection layer 231 is formed in the middle region 2 outside the display area 1, but not in the pad region. The thickness of the protection layer 231 may be more than about 4 μm.

Alternatively, according to an embodiment, the color filter may be formed by an Inkjet method, and may be coated in the middle region 2 where the protection layer 231 will be formed.

Next, as shown in FIG. 26, the water-repellent layer 90 is formed on the protection layer 231 by the slit coating method. The water-repellent layer 90 is formed in the display area and in the middle region 2 where the protection layer 231 is formed, but not in the pad region on the gate pad auxiliary electrode 192 and the data pad auxiliary electrode 197. For this purpose, the slit on/off switching is controlled. Although FIG. 26 shows the end of the protection layer 231 and the water-repellent layer 90 as coinciding with each other, other embodiments are not limited thereto. The water-repellent layer 90 is hydrophobic, so that it is challenging to form an overlying layer, the result of which is that it is challenging to from a seal member. Accordingly, the protection layer 231 may be formed wider than the water-repellent layer 90.

Next, as shown in FIG. 24, the water-repellent layer 90 and the protection layer 231 are removed from the middle region 2. In a present embodiment, the water-repellent layer 90 is removed by the edge bead removal (EBR) method. The edge bead removal (EBR) method emits plasma from the electrode bar 15 to etch the surrounding layer, and the electrode bar 15 is respectively positioned in the middle region 2 of the upper, lower, right, and left surfaces of the display area. At this time, the water-repellent layer 90 of the middle region is completely removed by the edge bead removal (EBR), however the underlying protection layer 231 may partially remain, different from that shown in FIG. 24.

Next, an embodiment of forming a protection layer 221 and a black matrix will be described with reference to FIGS. 27 to 29.

Figure 27:
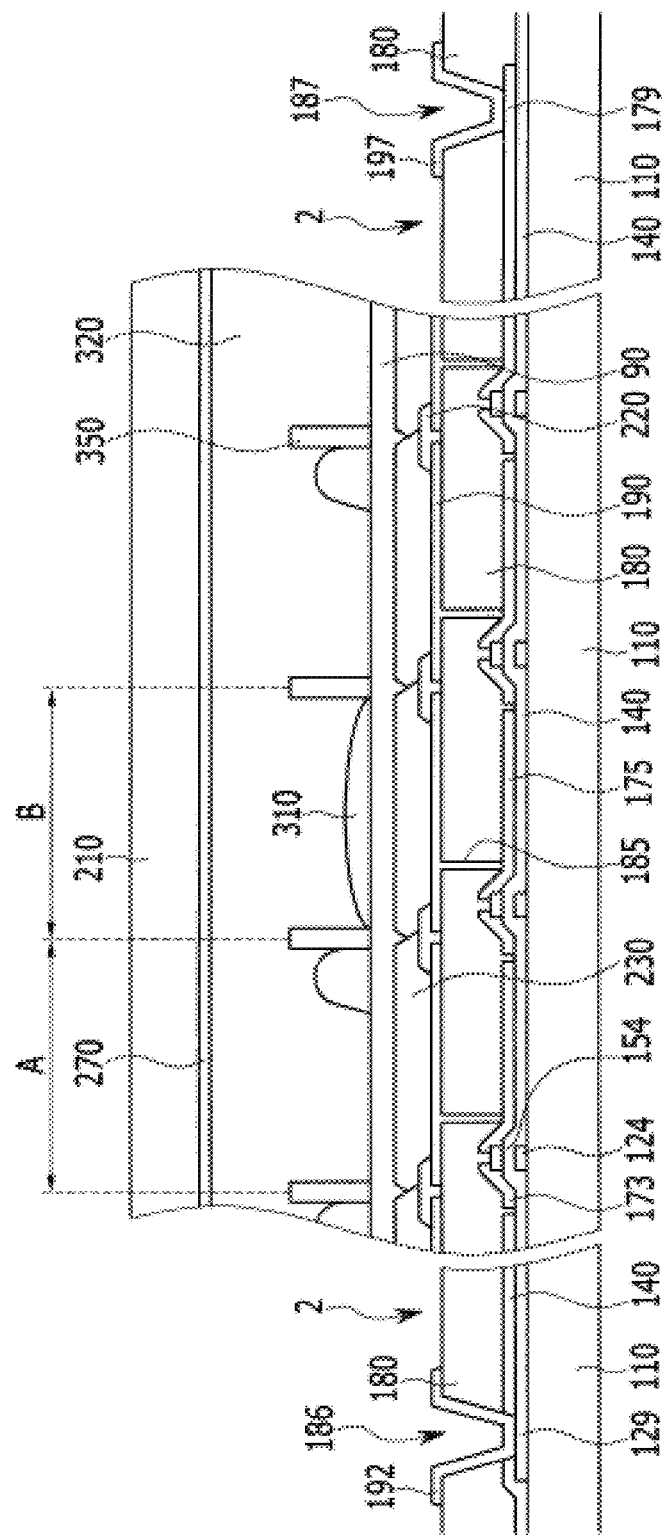
FIG. 27 is a cross-sectional view of an electrowetting display device according to another embodiment of the present disclosure.

FIG. 27 is a cross-sectional view of an electrowetting display device according to another embodiment of the present disclosure.

As shown in FIG. 27, a transmissive type electrowetting display device according to an embodiment of the present disclosure includes a lower substrate 110 with a pixel electrode 190 formed thereon, an upper substrate 210 facing the lower substrate 110 with a common electrode 270 formed thereon, and electro-optic layers 310 and 320 positioned between the lower substrate 110 and the upper substrate 210. The lower substrate 110 includes partitions 350 that define a plurality of openings (spaces between partitions), the electro-optic layer 310 includes a black oil layer 310 disposed inside the openings of the partition 350 and the electro-optic layer 320 includes an aqueous solution layer 320 positioned between the partition 350 and the black oil layer 310, and the common electrode 270.

The lower substrate 110 and the upper substrate 210 may be flexible substrates made of glass, plastic, or a glass fiber reinforced plastic (FRP).

Gate electrodes 124 and a gate extension 129 are connected to a plurality of gate lines (not shown) extending in one direction and are formed on the lower substrate 110. The gate extension 129 is a portion having an expanded width to receive a gate signal from a gate driver. A gate insulating layer 140 made of silicon nitride (SiNx) is formed on the gate electrode 124 and the gate extension 129.

A semiconductor layer 154 made of a hydrogenated amorphous silicon is formed on the gate insulating layer 140. The semiconductor layer 154 forms a channel of the thin film transistor. A data line (not shown) and a drain electrode 175 are formed on the gate insulating layer 140 and the semiconductor layer 154. The data line extends in a direction perpendicular to the gate line thereby intersecting the gate line, and a branch extending from the data line includes a source electrode 173 and a data expansion 179 that is sufficiently wide to receive a data voltage from a data driver. At least portions of the source electrode 173 and the drain electrode 175 are positioned on the semiconductor layer 154, and they are separated from and opposite each other with respect to the gate electrode 124.

An ohmic contact (not shown) is positioned between the semiconductor layer 154, and the source electrode 173 and the drain electrode 175, thereby reducing contact resistance therebetween.

An interlayer insulating layer 180 made of an insulating material such as silicon oxide, silicon nitride or an organic material is formed on the source electrode 173, the drain electrode 175, the semiconductor layer 154, and the gate insulating layer 140. The interlayer insulating layer 180 includes a contact hole 185 exposing the drain electrode 175, a contact hole 186 exposing the gate extension 129, and a contact hole 187 exposing the data expansion 179. The contact hole exposing the gate extension 129 is formed through the gate insulating layer 140.

A pixel electrode 190, a gate pad auxiliary electrode 192, and a data pad auxiliary electrode 197 made of a transparent conductive material such as ITO (indium tin oxide) or IZO (indium zinc oxide) are formed on the interlayer insulating layer 180.

The pixel electrode 190 is physically and electrically connected to the drain electrode 175 through the contact hole 185. The gate pad auxiliary electrode 192 is connected to the gate extension 129 through the contact hole 186 exposing the gate extension 129. The data pad auxiliary electrode 197 is connected to the data expansion 179 through the contact hole 187 exposing the data expansion 179.

Figure 28:
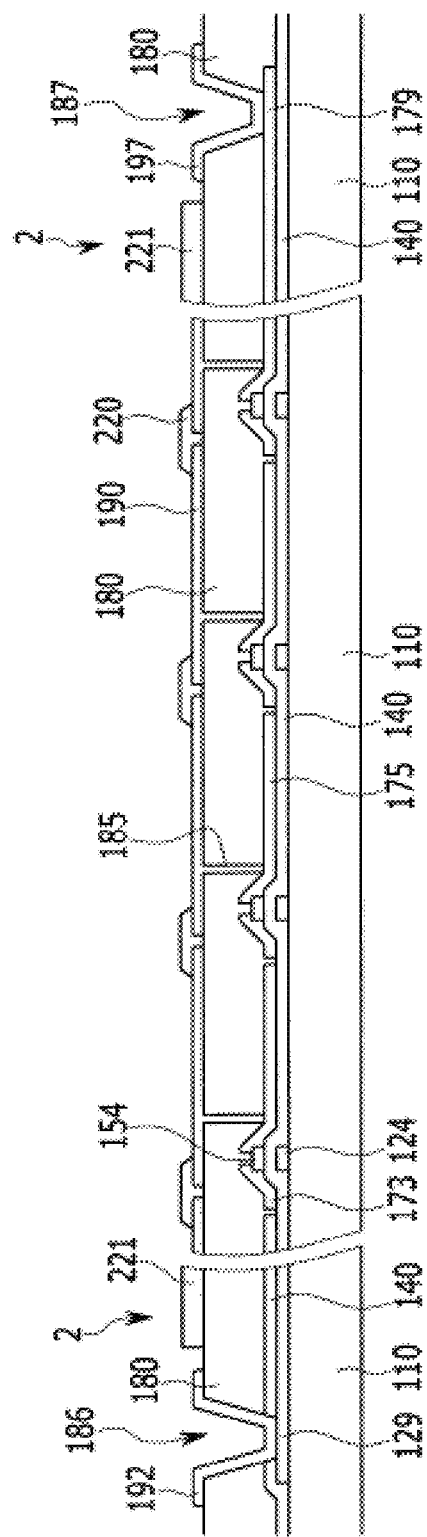
FIGS. 28 and 29 are cross-sectional views of the manufacturing steps of an electrowetting display device according to an embodiment of FIG. 27.
Figure 29:
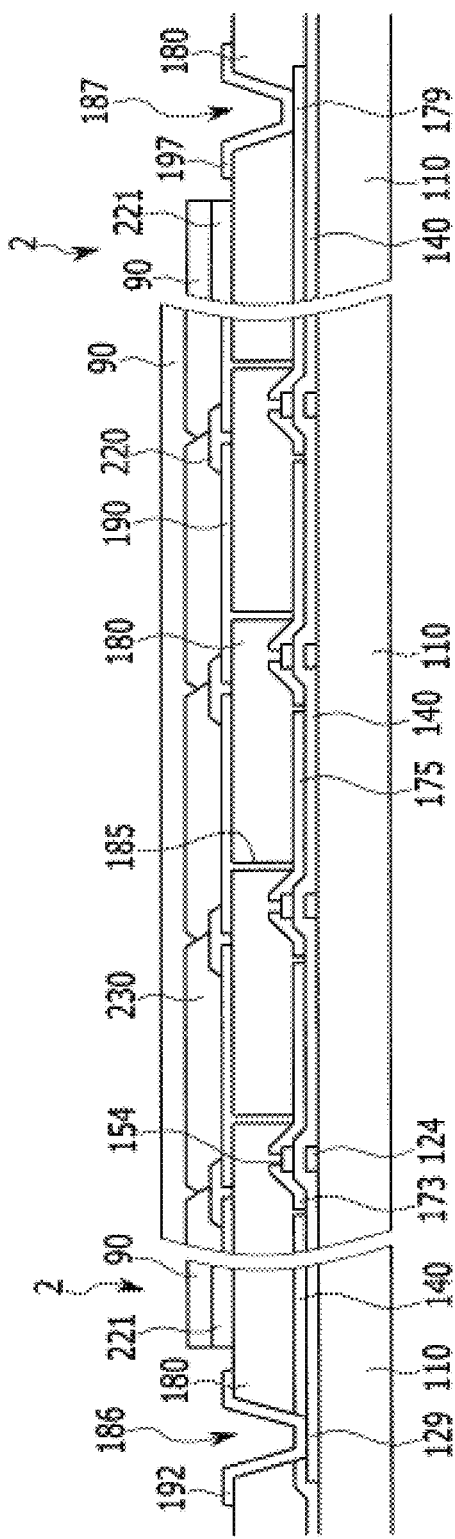

A black matrix 220 having openings is formed on the pixel electrode 190, and a protection layer 221, shown in FIGS. 28 and 29, is formed in the middle region 2 along with the black matrix 220. The protection layer 221 is formed of the same material as the black matrix. However, the protection layer 221 is removed from the middle region 2 by etching. The black matrix 220 and the protection layer 221 may be formed of an organic material including an opaque pigment that absorbs light.

Color filters 230 are formed on the pixel electrode 190 and the black matrix 220. The color filters 230 include pigments that transmit predetermined wavelengths or that may be made of a semiconductor quantum dot material.

A water-repellent layer 90 is formed on the color filter 230. The water-repellent layer 90 is made of a hydrophobic insulating material. As shown in FIG. 29, the water-repellent layer 90 is formed on the protection layer 221 in the middle region 2, however it is removed by etching. The water-repellent layer 90 is not formed on the gate pad auxiliary electrode 192 or the data pad auxiliary electrode 197.

The partitions 350 having openings are formed on the water-repellent layer 90, and the black oil layer 310 is formed between the openings of the partitions 350.

The common electrode 270 is formed under the upper substrate 210.

In addition, the aqueous solution layer 320 is formed between the partition 350 and the black oil layer 310, and the common electrode 270. The aqueous solution layer 320 does not mix with the black oil layer 310.

In addition, according to an embodiment, the gate driver may be integrally formed with the gate pad auxiliary electrode 192. At this time, the gate driver is formed in the same process with which the display area is formed, and the gate line does not need to form the gate extension 129 and may connect directly to the gate driver. In this case, the gate pad auxiliary electrode 192 may be omitted, and the contact hole exposing the gate extension 129 may also be omitted.

Next, a manufacturing method of an electrowetting display device according to an embodiment of FIG. 27 will be described with reference to FIGS. 28 and 29.

FIGS. 28 and 29 are cross-sectional views of the manufacturing step of an electrowetting display device according to an embodiment of FIG. 27.

First, referring to FIG. 28, the gate line including the gate electrode 124 and the gate extension 129, the gate insulating layer 140, the semiconductor layer 154, the data line including the source electrode 173 and the data expansion 179, and the drain electrode 175 are sequentially formed on the lower substrate 110, and the interlayer insulating layer 180 is deposited to cover them.

Next, the contact hole 185 exposing the drain electrode 175, the contact hole 186 exposing the gate extension 129, and the contact hole 187 exposing the data expansion 179 are formed in the interlayer insulating layer 180.

Next, a transparent conductive material such as ITO (indium tin oxide) or IZO (indium zinc oxide) is deposited and patterned to form the pixel electrode 190, the gate pad auxiliary electrode 192, and the data pad auxiliary electrode 197. The pixel electrode 190 is connected to the drain electrode 175 through the contact hole 185 exposing the drain electrode 175. The gate pad auxiliary electrode 192 is connected to the gate extension 129 through the contact hole 186 exposing the gate extension 129, and the data pad auxiliary electrode 197 is connected to the data expansion 179 through the contact hole 187 exposing the data expansion 179.

Next, a protection layer 221 is formed along with the black matrix 220. The protection layer 221 is formed of the same material as the black matrix 220.

That is, in an embodiment of FIG. 27, the protection layer 221 is formed of the same material as the black matrix, different from the protection layers 195, 351, and 231 of FIGS. 1, 20, and 24, respectively, and is referred to as a black matrix protection layer 221. The black matrix material is etched to form the openings of the black matrix 220 after coating, at which time the black matrix material is removed from the gate pad auxiliary electrode 192 and the data pad auxiliary electrode 197. At this time, the protection layer 221 may be etched to be thinner than the black matrix 220. The protection layer 221 is formed in the middle region 2 outside the display area 1, but not in the pad region. The thickness of the protection layer 221 may be more than about 4 μm.

Next, as shown in FIG. 29, the color filter 230 is formed on the black matrix 220 and the pixel electrode 190, and the water-repellent layer 90 is formed on the color filter 230 by the slit coating method.

The water-repellent layer 90 is coated in the display area and in the middle region 2 where the protection layer 231 is formed, but not in the pad region on the gate pad auxiliary electrode 192 and the data pad auxiliary electrode 197. For this purpose, the slit on/off switching is controlled. Although FIG. 29 shows the ends of the protection layer 221 and the water-repellent layer 90 as coinciding with each other, other embodiments are not limited thereto. The water-repellent layer 90 is hydrophobic, such that it is challenging to form an overlying layer, the result of which is that it is challenging to form a seal member. Accordingly, the protection layer 221 may be formed wider than the water-repellent layer 90.

Next, as shown in FIG. 27, the water-repellent layer 90 and the protection layer 221 are removed from the middle region 2. In a present embodiment, the water-repellent layer 90 is removed by the edge bead removal (EBR) method. The edge bead removal (EBR) method emits plasma from the electrode bar 15 to etch the surrounding layer, and the electrode bar 15 is respectively positioned in the middle region 2 of the upper, lower, right, and left surfaces of the display area. At this time, the water-repellent layer 90 of the middle region is completely removed by the edge bead removal (EBR), however the underlying protection layer 221 may partially remain, different from that shown in FIG. 27.

CONCLUSION

While this disclosure has been described in connection with what is presently considered to be practical embodiments, it is to be understood that the disclosure is not limited to the disclosed embodiments, but, on the contrary, is intended to cover various modifications and equivalent arrangements included within the spirit and scope of the appended claims.

What is claimed is:

1. A method of manufacturing an electrowetting display device comprising a display area, the method comprising:
   forming a pixel electrode in the display area;
   forming a protection layer on the pixel electrode of the display area and on a region located between the display area and a pad region of the electrowetting display device;
   coating a hydrophobic insulating material on the protection layer to form a water-repellent layer; and
   removing the water-repellent layer from the region.

2. The method of claim 1, wherein:
   the water-repellent layer is formed on the protection layer by a slit coating method by moving a nozzle in one direction while turning the nozzle on and off, and the water-repellent layer is removed from the region by an edge bead removal (EBR) method which uses an electrode bar to emit a plasma to remove the water-repellent layer, wherein the electrode bar is respectively positioned at upper, lower, right, and left surfaces of the display area.

3. The method of claim 1, wherein
the protection layer comprises an organic material.

4. The method of claim 3, further comprising, after forming the water-repellent layer,
forming partitions with openings that define pixel areas in the display area.

5. The method of claim 1, further comprising
forming partitions with openings that define pixel areas in the display area,
wherein the protection layer on the pixel electrode of the display area and on the region is simultaneously formed with the partitions.

6. The method of claim 5, wherein
the partitions and the protection layer are made of an organic layer comprising a black pigment.

7. The method of claim 1, further comprising
forming color filters in the display area, wherein
the protection layer on the pixel electrode of the display area and in the region is simultaneously formed with the color filters.

8. The method of claim 7, further comprising, after forming the water-repellent layer,
forming partitions with openings that define pixel areas in the display area.

9. The method of claim 1, further comprising
forming a black matrix in the display area, wherein
the protection layer on the pixel electrode of the display area and in the region is simultaneously formed with the black matrix.

10. The method of claim 9, further comprising, after forming the water-repellent layer,
forming partitions having openings that define pixel areas in the display area.

11. An electrowetting display device comprising:
one or more pad auxiliary electrodes formed in the pad region;
a pixel electrode formed in the display area;
a water-repellent layer positioned on the pixel electrode; and
a protection layer formed in a region that is formed of a same material as a layer formed in the display area between the pixel electrode and the water-repellent layer.

12. The electrowetting display device of claim 11, wherein
the protection layer formed of the same material as an organic layer is formed between the pixel electrode and the water-repellent layer.

13. The electrowetting display device of claim 11, wherein
the protection layer formed of the same material as that of partitions is formed between the pixel electrode and the water-repellent layer.

14. The electrowetting display device of claim 11, wherein
the protection layer formed of the same material as that of color filters is formed between the pixel electrode and the water-repellent layer.

15. The electrowetting display device of claim 11, wherein
the protection layer formed of the same material as that of a black matrix is formed between the pixel electrode and the water-repellent layer.

16. A method of manufacturing an electrowetting display device, the method comprising:
forming a pixel electrode in the display area and pad auxiliary electrodes in a pad region;
forming a water-repellent layer from a hydrophobic insulating material by a slit coating method by moving a nozzle in one direction while turning the nozzle on and off; and
forming partitions having openings that define pixel areas in the display area.

17. The method of claim 16, further comprising, before forming the water-repellent layer, forming a protection layer of an organic material on the pixel electrode of the display area and on a region located between the display area and the pad region, wherein the protection layer is wider than the water-repellent layer.

18. The method of claim 16, further comprising forming a protection layer on the pixel electrode of the display area and on a region located between the display area and the pad region when the partitions are formed, wherein the partitions and the protection layer are made of an organic layer comprising a black pigment.

19. The method of claim 16, further comprising simultaneously forming color filters in the display area and a protection layer on the pixel electrode of the display area and in a region located between the display area and the pad region.

20. The method of claim 16, further comprising simultaneously forming a black matrix in the display area and a protection layer on the pixel electrode of the display area and in a region located between the display area and a pad region.

21. The method of claim 16, further comprising, before forming the partitions, removing the water-repellent layer from a region located between the display area and a pad region.

* * * * *